(12) United States Patent
Veloso et al.

(10) Patent No.: US 8,604,931 B1
(45) Date of Patent: Dec. 10, 2013

(54) ELECTRONIC DEVICE FOR DRIVING SAFETY

(76) Inventors: Carlos J. Veloso, Linden, NJ (US); Jose V. Veloso, Linden, NJ (US); Robert A. Riker, Lafayette, NJ (US)

( * ) Notice: Subject to any disclaimer, the term of this patent is extended or adjusted under 35 U.S.C. 154(b) by 428 days.

(21) Appl. No.: 13/039,395

(22) Filed: Mar. 3, 2011

(51) Int. Cl.
  *G08B 21/00* (2006.01)
(52) U.S. Cl.
  USPC ....... 340/573.1; 340/529; 340/532; 340/5.31; 455/90.3; 361/1; 701/36
(58) Field of Classification Search
  USPC ............. 340/532, 529, 5.31, 573.1; 455/90.3, 455/575.1; 361/1; 701/36
  See application file for complete search history.

(56) References Cited

U.S. PATENT DOCUMENTS

| 6,029,110 | A | 2/2000 | Zuber et al. |
| 6,256,558 | B1 | 7/2001 | Sugiura et al. |
| 8,417,268 | B1 * | 4/2013 | Halferty et al. ............... 455/466 |
| 2004/0122562 | A1 * | 6/2004 | Geisler et al. ..................... 701/1 |
| 2005/0107046 | A1 * | 5/2005 | Desbarats et al. ........... 455/90.3 |
| 2006/0006990 | A1 * | 1/2006 | Obradovich .................. 340/439 |
| 2011/0288724 | A1 * | 11/2011 | Falk ............................... 701/36 |

* cited by examiner

*Primary Examiner* — Mohammad Ghayour
*Assistant Examiner* — Mark Rushing
(74) *Attorney, Agent, or Firm* — Richard L. Marsh

(57) ABSTRACT

A security access device for a portable electronic device comprises a plurality of security access buttons recessed into depressions on at least a portion of the external surface of the security access device. More than one security access button requires continual contact of a pad of at least two digits of at least one hand or up to four digits of both hands of a user of the electronic device for safe operation of the electronic device.

13 Claims, 18 Drawing Sheets

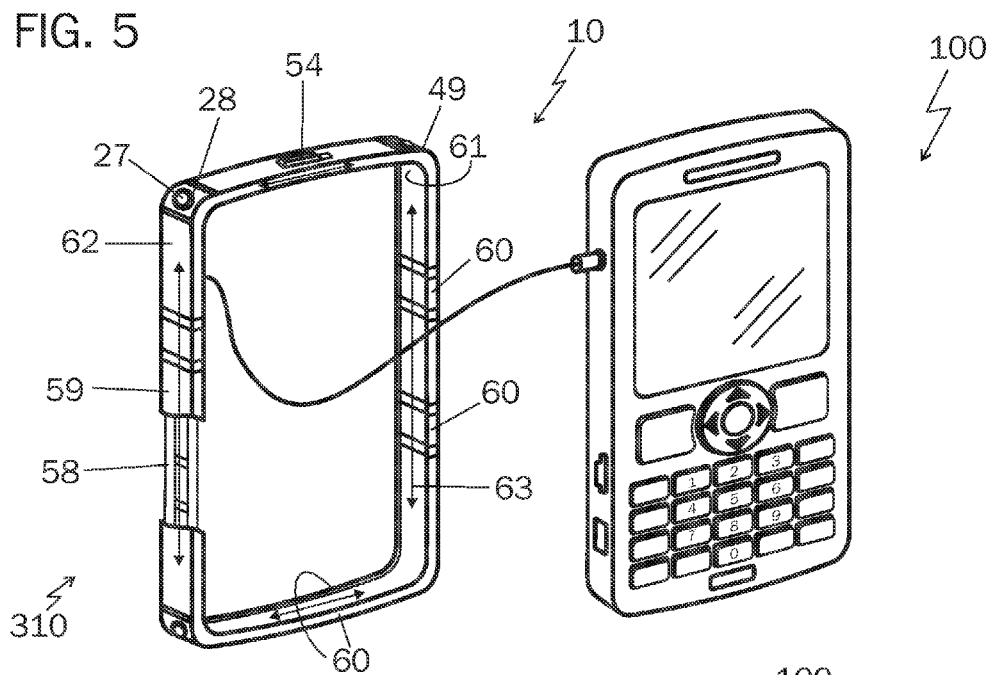
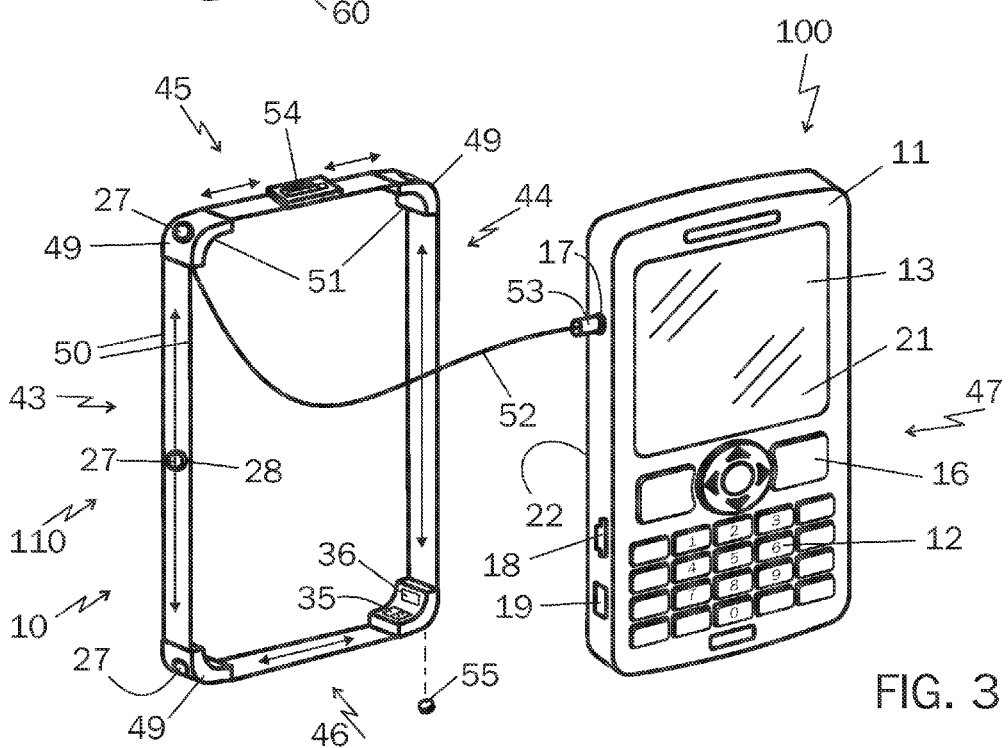

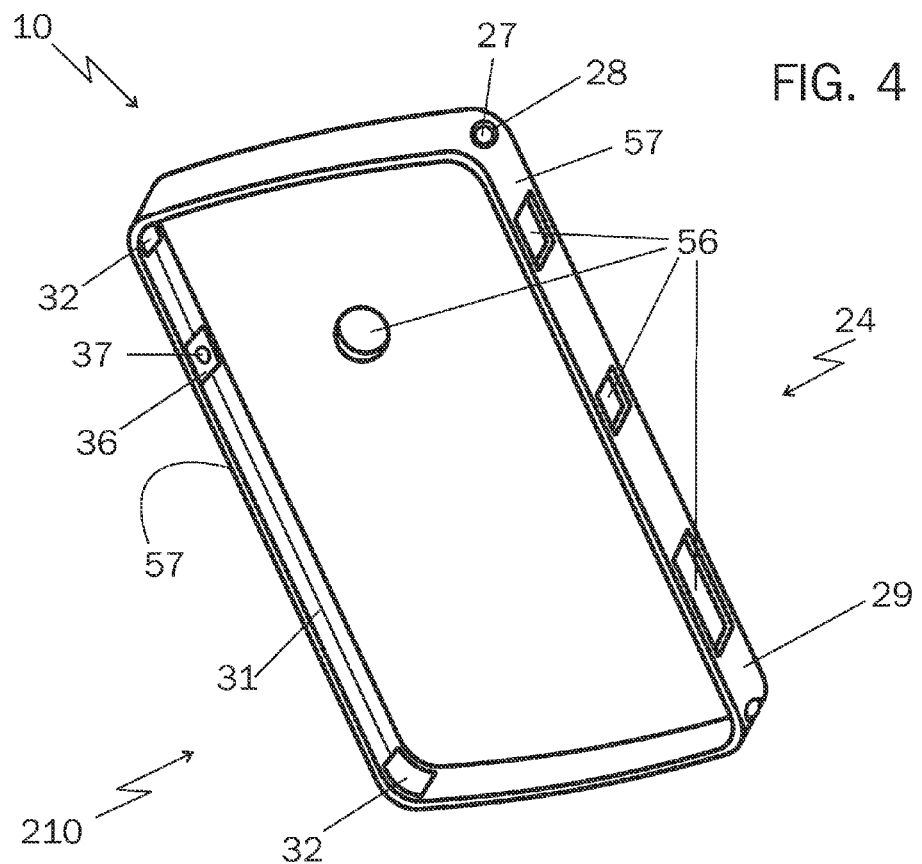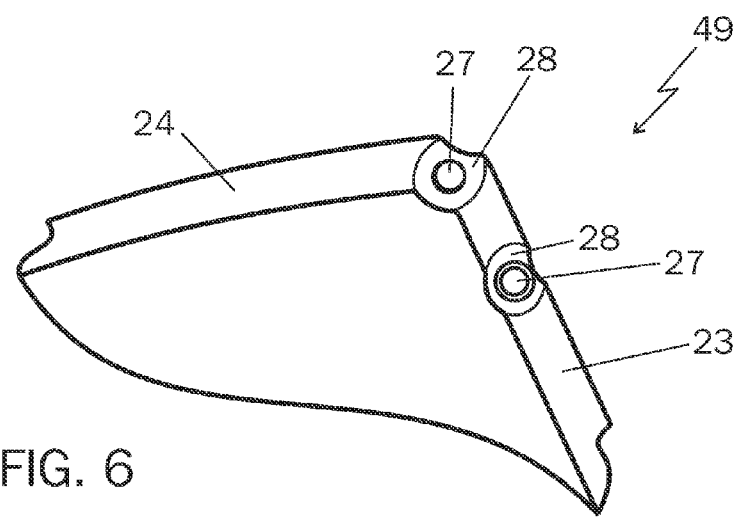

ELECTRONIC DEVICE FOR DRIVING SAFETY

BACKGROUND OF THE INVENTION

1. Field of the Invention

This invention relates to an electronic device to prevent an operator of a motor vehicle from operating the electronic device while operating the vehicle, or to prevent a prudent operator of an electronic device from operating a motor vehicle, or other potentially safe multi-task while operating the electronic device. More specifically, the electronic device has a plurality of buttons recessed with means for finger/digit contact wherein at least two buttons must be held depressed by a pad of at least two digits of one hand or up to four digit of both hands while operating the electronic device.

2. Prior Art Statement

Humans have thumbs opposed to the forefingers to assist with holding an object such as a hand held electronic device of the group consisting of telephones, smart phones, superwatches, computers, calculators, readers, multi-functional touch screens, notebooks, notepads, note tablets, digital cameras, video consoles or combinations thereof. It has now become common practice, especially with cellular telephones, to rest the bottom of the electronic device upon the small fingers of both hands, support the back of the electronic device with the middle fingers and use the opposed thumbs for operation of the keyboard of the electronic device while multi-tasking such as driving or operating a motor vehicle. To add to the unsafe common practice of operation of an electronic device, especially with cellular telephones and the so-called "Smart Phones," to use one hand holding the electronic device while the opposing hand is holding the steering wheel of a moving motor vehicle for the purpose of operating the electronic device to receive or make a call, to receive or send text messages, attempt Internet access, view the screen for images, send images via Internet, take still pictures or continuous video, play games or operate other distracting gadgets within the electronic device produces even greater distraction. Use of electronic devices in this manner has resulted in communication by text messaging, that is "texting" that has created hazardous situations especially while driving an automobile. In fact, studies have shown that driving while operating a portable hand held electronic device is akin to drunk driving thus increasing the chance of an accident by four times and texting while driving has been shown to be more than twenty three times more hazardous as unimpaired driving. The Secretary of Transportation has recently said that "There is an epidemic in America," in reference to cell phones use and texting while driving. One study by Liberty Mutual Insurance Company shows that, while driving, 86% of people talk on the phone, 76% text sometimes, 33% text often and 50% of teenagers text. The National Safety Council reported that one out of every four accidents involves the driver talking or texting. In 2009, 5870 deaths on US highways attributed to talking or texting while driving were reported. That number of traffic fatalities has been equated to a major airliner crashing every week in the U.S. For instance, see the article "Health Day Reporter," Steven Reinberg, Sep. 23, 2010 (HealthDay News) quoting Jennifer Smith, a board member of FocusDriven, which advocates against cell phone use while driving. The US Department of Transportation has proposed a ban on text messaging at the wheel by interstate truck and bus drivers which would make permanent an interim ban announced in January 2010. The current trend for manufacturers of portable electronic devices is to make these devices easier to use, even while driving, rather that prohibit use though some efforts have been introduced to limit driver access.

The rise of the "Smart Phone" does more than make calls and text messages. The average "Smart Phone" is a veritable Swiss Army knife able to serve an increasing range of communication and entertainment functions, from taking pictures, to location information from Global Positioning System commonly referred to as "GPS", to surfing the Internet, sending e-mail, playing a range of audio files or viewing a range of video files. With the "Smart Phone," an operator can save money, stay in touch, travel lighter, be entertained and informed with a device for the pocket. There are an estimated 250 million "Smart Phone" users at present and it is estimated that by 2014 there will be 500 million users. The mobile users surveyed by Lightspeed Research found that 37 percent of users use the "Smart Phone" to locate friends, family and children, 27 percent use the "Smart Phone" as an electronic key for the home or vehicle, 27 percent use the "Smart Phone" as a platform for monitoring home security and 21 percent use the "Smart Phone" as a passport or identity document when traveling. In addition, more features are expected to be added to the "Smart Phone" as it evolves.

"Smart Phones" will replace the GPS as payment for the separate service will not be required. With GPS, it is possible to estimate the yardage to the green on a golf course. "Smart Phones" replace the video or digital camera with high quality digital images as the technology has grown sufficiently. Nokia is introducing a Nokia N8 "Smart Phone" with 12 megapixel resolution including Xenon flash and Zeiss optics which will record high definition video. This "Smart Phone" will connect with HDMI cable to display on larger screens or connect to GPS, BlueTooth, micro USB or USB flash drives. Additionally, the "Smart Phone" will enable a user to listen to music, play games, watch movies, television, convert compact disc collections and store them digitally on the "Smart Phone," or listen to digital radio signals from iHeartradio, WunderRadio and the like. With the constant rise and future growth of the "Smart Phone," the user will have a much greater temptation beyond calls and texting to use the smart phone while driving an automobile or other moving vehicles as well as operate machinery and or tools. It is therefore, imperative to have an electronic device that prevents the operator from using the "Smart Phone" in these instances. Statistically, without such a device, there will be many more accidents and unnecessary loss of innocent lives. Some states are passing laws to ban texting while driving. For instance, Massachusetts Governor Deval L. Patrick recently signed a bill that bans the following specific actions on a mobile device including phones, laptops, pagers or other handheld devices.

1. Sending a text or instant message.
2. Use of electronic mail.
3. Accessing the Internet.
4. Use of the device for GPS navigation.

It is known to provide a "push-to-talk" device such as "walkie-talkies," CB radios or military field communication devices. Though not used for texting while driving, these devices require a button to be held by a pad of one finger of one hand in order to effect voice communication though operation by one hand is certain. Walkie Talkies are short range communication devices, military field communication devices have a longer, but still limited range and though CB radios are widely used, they are also not as ubiquitous as personal hand held portable electronic devices now used by the general population and thus do not present as great of hazard. Thus, there is a need for a means to limit operation of hand held portable electronic devices by providing a plurality of security access buttons wherein at least two buttons require continual contact of a pad of at least two digits of at least one hand or up to four digits of both hands of a user of the electronic device for operation such that these devices occupy both hands of the operator so that driving is so hazardous that even a imprudent driver will not attempt.

Known along the lines of CB radios is an electronic navigation device that has an access button provided remote from the installed navigation device or on the external periphery thereof in order to use the control keys of the device, yet limiting access to the driver. The access button preferably must be continuously depressed in order to control the device. The system employing the device has sensors to determine the presence of a passenger or motion of the vehicle, thus enabling the passenger to control the device while moving. For instance, see the U.S. Pat. No. 6,029,110 issued on 22 Feb. 2002 to Zuber, et al. Only one access button is provided, and since such a navigational system is generally mounted in the vehicle and generally within reach of the driver, the button can be depressed by one digit while operating the system with at least one other digit thus not preventing the driver from operation of the system. Furthermore, the driver must reach for the access button which might also increase hazardous driving. Therefore, there exists a great need for an electronic device to prevent an imprudent operator of a motor vehicle from operating the electronic device while operating the vehicle. There is also a need for an electronic device that has a plurality of buttons recessed with means for finger/digit contact which must be held depressed by at least two fingers of one hand or up to four digits of both hands while operating the electronic device.

It is also known to provide a vehicular display system which is centrally located on the dashboard and is operable with a plurality of switches to display navigation, telephone, television, CD, radio or cassette player. The system is linked to a speed sensor to determine if the vehicle is in motion and also linked to at least one drive enforcement button located in the driver's compartment. Preferably, two drive enforcement buttons are located on opposite sides of the steering wheel and must be held depressed in order to allow the display system to be used. For instance, see the U.S. Pat. No. 6,256,558 B1 issued on 3 Jul. 2001 to Sugiura, et al. The driver controls access to the device by button(s) on the steering wheel though a hand held remote device is shown in FIG. 6. Though effectively preventing a driver from using an installed device on a vehicle, the device does not prevent a driver from using a hand held device because the drivers hands are free if access to the installed device is not required. Furthermore, the buttons on the wheel are not depressed into the surface thereof and thus can be held depressed by rubber bands or the like. Thus, there still exists a great need to reduce the improper use of a hand held portable electronic device while driving by providing a replacement housing in the form of a security device or a surrounding housing such as a security device for a hand held electronic device that has a plurality of access buttons recessed with means for finger/digit contact that must be held depressed in order to access the hand held portable electronic device.

It is further known to provide a controller that monitors a plurality of physical data related to the vehicle or its environment and disables a communication device if the controller determines that a high risk to the driver is present. The communication device must be connected to and enabled by the controller. The communication device may have an override switch to enable communication under any conditions. For instance, see U.S. Pat. No. 6,502,022 B1 issued on 31 Dec. 2002 to Chastain, et al. Since the communication device must be connected to the controller, there is nothing to prevent use of the device if disconnected therefrom. Therefore, there is still a need for a replacement housing in the form of a security device or a surrounding housing such as a security device for a portable electronic device that prevents a imprudent operator of a vehicle from accessing the functions of the portable electronic device by providing the replacement housing in the form of a security device or a surrounding housing such as a security device with a plurality of security access buttons that require constant depression by at least two digits of at least one or up to four digits of both hands.

Additionally, it is known to provide a stand alone electronic device that has a controller which may disable at least one feature of an electronic device depending upon its location, use and/or motion. For instance, the device may be completely disabled if it is determined that the device is in a driver's quadrant of a vehicle in motion while still allowing users in other quadrants. Additionally, access to certain features, such as ring tones, speaker or mouthpiece may be disabled in structures where interference may occur or where silence is desired, such as theaters or libraries. A vehicle or structure controller sets the parameters for disabling or enabling use of devices and either transmits a disabling signal directly to the device or to a service provider of the device. For instance, see the U.S. Pat. No. 6,690,940 issued on 10 Feb. 2004 to Brown, et al. Though this device may prevent operation while in the driver's quadrant of a vehicle, the device requires a third party device such as an onboard controller in an automobile or the service provider of the device thus making the device extremely costly to install and implement. Therefore, there is a great need for a simple and inexpensive solution to prevent driver use of a portable electronic device while simultaneously operating the vehicle. One simple and inexpensive solution is to provide the replacement housing in the form of a security device or a surrounding housing such as a security device of this invention which has a plurality of security access buttons wherein at least two oppositely positioned buttons require constant depressing by at least two digits of at least one hand or up to four digits of both hands. The oppositely positioned buttons may be touch screen pads, physical buttons or a combination thereof.

Moreover, it is known to provide a monitoring and control system for cell phones which includes detection of a hands free adapter, weather conditions, motion, restricted zones and other inputs over a control channel to enable or disable communications over the traffic channel Generally, if the hands free adapter signal is present and severe weather is not present, the device is enabled whether it is detected to be in motion or not. There is one embodiment where engine noise is detected either as a primary signal or a redundant signal to the control system. For instance, see the U.S. Pat. No. 6,799,052 B1 issued on 28 Sep. 2004 to Agness, et al. As with Brown, et al., considerable electronics are required to make this system work and thus it is both expensive and complicated. As has been stated hereinbefore, there still exists a need for a simple and inexpensive means for preventing use of a portable electronic device while operating a motor vehicle. Such a device is fully described in the instant invention wherein at least two digits of at least one hand or up to four digits of both hands must fully depress a plurality of recessed access buttons in order for the portable electronic device to operate.

Finally, it is known to provide a portable first controller which is primarily personal and intended to store one's personal settings for home, auto, office or the like and is electronically linked to a fixed controller in the specific environment. The first controller is similar to a personal data assistant, Blackberry or iPhone with internal programming for the personal settings. The fixed controller in the steering wheel of an automobile has a lockout component operatively connected to the vehicle operational sensors to deny use of the first controller when the vehicle is being driven. For instance, see the U.S. Pat. No. 7,197,364 B2 issued on 27 Mar. 2007 to Chernoff, et al. This device is at least a two part system that requires considerable electronics in multiple places to be fully functional. Such a system is costly to manufacture, difficult to install and program and cumbersome to use. Therefore, it is imperative that a simple and affordable device be provided which prevents operation of a portable electronic device while driving while multi-tasking such as driving a vehicle. Such a device is hereinafter described and requires at least two digits of at least one hand or up to four digits of both hands to retain depressed a plurality of access buttons recessed with means for finger/digit contact in order for the portable electronic device to operate.

SUMMARY OF THE INVENTION

As use of portable electronic devices while driving has rapidly increased, such use has become of great concern for conscious drivers, parents of young operators, passengers, pedestrians and employers from all fields where operation of a vehicle, medical or scientific equipment, instruments, consoles, applicators, power tools or hand tools is a part of the employment. Such professions include OTR truck driving, sales, government agencies, law enforcement, public bus/train/airplane transportation operators, boat/ship operators, off road equipment operation, warehouse equipment operators, manufacturing machinery operators and learned professions such as scientists, doctors and dentists. Accordingly, there is a need for a means to provide for safe operation of electronic devices by persons responsible for two-hand safe operation of vehicles, medical and scientific equipment, machinery, instruments, consoles, applicators and/or power tools such as parents or employers.

One object of this invention is to provide a security device for a portable electronic device wherein the security device is adapted to replace the case or portion thereof of the portable electronic device, the security device comprising a plurality of security access buttons recessed into depressions on at least a portion of the external surface of the security device and wherein more than one security access button recessed with means for finger/digit contact requires continual contact of a pad of at least two digits of at least one hand or up to four digits of both hands of a user of the electronic device for operation of the electronic device.

One significant object of this invention is to provide a plurality of security access buttons on a circuit board of an electronic device which are accessible through recessed depressions formed into at least a portion of the external surface of a security device for the circuit board and/or as icon buttons upon a viewing screen wherein more than one security access button with means for finger/digit contact requires continual contact of a pad of at least two digits of at least one hand or up to four digits of both hands of a user of the electronic device for operation of the electronic device.

An object of this invention is to provide a security device for a portable electronic device that comprises a plurality of security access buttons disposed into a portion of an external surface of the security device wherein at least two security access buttons must be held depressed in order to operate the electronic device and wherein if fewer than four security access buttons are designated active, pressing any other security access button interferes with operation of the electronic device. The purpose is so that a mechanical device like a clamp or strap cannot be used to activate all security access buttons at all times.

Another object of this invention is to provide a security device for a portable electronic device which replaces the case of the electronic device and has a plurality of security access buttons recessed into depressions to prevent the operator from driving while using the electronic device such as telephones, computers, calculators, readers, multi-functional touch screens, notebooks, notepads, note tablets, digital cameras, video consoles or combinations thereof.

One goal of this invention is to provide a security device for a portable electronic device wherein the security device is adapted to replace the case, the security device comprising a plurality of security access buttons recessed into depressions with means for finger/digit contact on at least a portion of the external surface of the security device to prevent attempting operation of the device by pressing the device against a solid object at the points where the security access buttons are located.

A primary goal of this invention is to provide a security device for a portable electronic device wherein the security device is adapted to replace the case of the electronic device and wherein the security device comprises a plurality of security access buttons recessed into depressions which are designated active buttons, the designated active buttons programmed by an owner responsible for safe operation of the electronic device by a user thereof.

A feature of this invention is to provide a security device for a portable electronic device wherein the security device comprises a plurality of security access buttons recessed into depressions on at least a portion of the external surface of the security device and wherein the security access buttons have a shape selected from the group consisting of sphere, cylinder, cone, pyramid, torus, cube, concave and convex or combinations thereof.

One purpose of this invention is to provide a security device for a portable electronic device wherein the security device comprises a plurality of security access buttons recessed into depressions on at least a portion of the external surface of the security device and wherein the security access buttons may have a surface which detects contact by a human finger in order to effect operation of the security access buttons.

An aim of this invention is to provide a security device that has security access buttons arranged around the periphery thereof yet has an emergency button thereupon which activates a call to emergency responders when switched and depressed.

One principle of this invention is to provide a security device that has security access buttons arranged around the periphery thereof and has a primary function switch to select between emergency use for activating a call to emergency responders or for normal access to the electronic device.

An aspect of this invention is to provide a security device that has security access buttons arranged around the periphery thereof and an emergency button wherein the security access buttons are different in color from an emergency button.

A significant feature of this invention is to provide a security device for a portable electronic device wherein the security device is adapted to replace the case of the electronic device and wherein the security device comprises a plurality of security access buttons recessed into depressions with means for finger/digit contact which are designated active buttons, the designated active buttons are arranged at four corners and programmed by an owner responsible for safe operation of the electronic device by a user thereof to any configuration of two or more buttons such as opposed diagonal corners, opposed pairs of the corners on one end or one side, one pair of diagonally opposed corners and another corner of one end.

A main purpose of this invention is to provide a security device for a portable electronic device wherein the security device is adapted to replace the case of the electronic device and wherein the security device comprises a plurality of security access buttons recessed into depressions which are designated active buttons, the designated active buttons are arranged at four corners and along the side edges thereof and programmed by an owner responsible for safe operation of the electronic device by a user thereof to any configuration of two or more buttons with means for finger/digit contact such on one side edge and at least one other side edge or at least one of the four corners and at least one side edge.

A primary principle of this invention is to provide a wireframe security device for surrounding a portable electronic device wherein the wireframe security device for surrounding the electronic device comprises a plurality of security access buttons recessed into depressions at selected locations along an external periphery of the wireframe security device, the security access buttons requiring continual contact of a pad of at least two digits of at least one hand or up to four digits of both hands of a user of the electronic device for operation of the electronic device.

A principal aim of this invention is to provide a wireframe security device for surrounding a portable electronic device wherein the wireframe security device comprises a plurality of security access buttons recessed into depressions at selected locations along an external periphery thereof, the security access buttons requiring continual contact of a pad of at least two digits of at least one hand or up to four digits of both hands of a user of the electronic device for operation of the electronic device and wherein the wireframe security device has adjustable sides and adjustable ends for installation on any one of a plurality of electronic devices selected from the group consisting of telephones, computers, calculators, readers, multi-functional touch screens, notebooks, notepads, note tablets, digital cameras, video consoles or combinations thereof.

A primary aspect of this invention is to provide a wireframe security device for surrounding a portable electronic device wherein the wireframe security device comprises a plurality of security access buttons recessed into depressions at selected locations along an external periphery thereof, the security access buttons requiring continual contact of a pad of at least two digits of at least one hand or up to four digits of both hands of a user thereof and wherein the security access buttons are electronically associated with the keyboard of the electronic device to effect a safe operation of the electronic device.

It is still an object of this invention to provide a custom molded security device for surrounding a portable electronic device wherein the molded security device comprises a plurality of security access buttons recessed into depressions in at least a portion of an external peripheral surface thereof, the security access buttons requiring continual contact of a pad of at least two digits of at least one hand or up to four digits of both hands of a user of said electronic device for operation of said electronic device and wherein the security access buttons are programmed by an owner responsible for safe operation of the electronic device by a user thereof.

BRIEF DESCRIPTION OF THE DRAWINGS

FIG. 3 is a perspective view of a second embodiment of the security device of this invention.

FIG. 4 is a perspective view of a third embodiment of the security device of this invention.

FIG. 5 is a perspective view of a fourth embodiment of the security device of this invention.

FIG. 6 is a fragmentary perspective view of security access buttons of the security device of this invention.

DESCRIPTION OF THE PREFERRED EMBODIMENTS

Figures 1A, 1B:
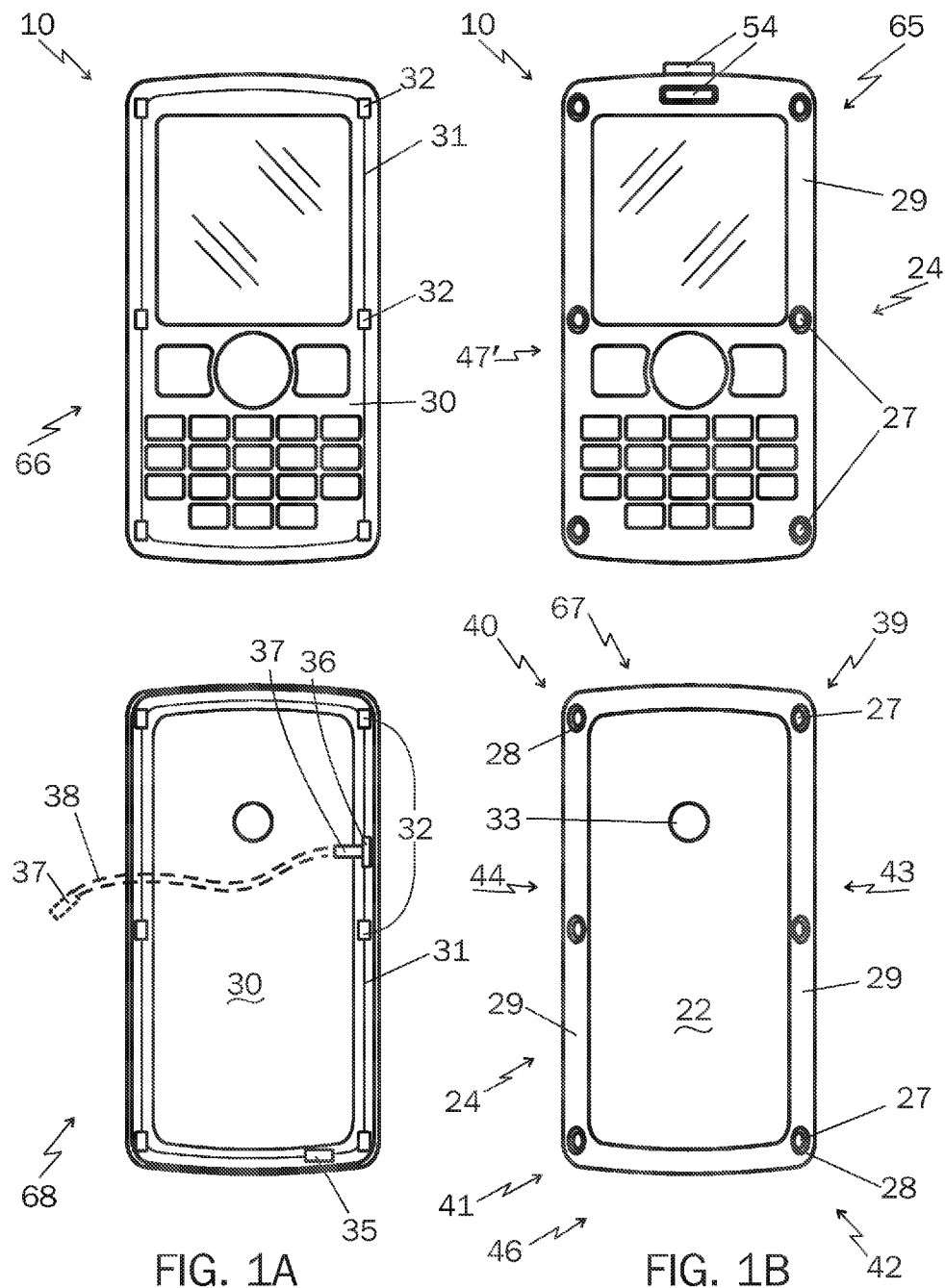
FIG. 1 is a perspective view of one embodiment of the security device of this invention, FIG. 1A showing an inside view thereof and FIG. 1B showing an outside view thereof.
Figure 2:
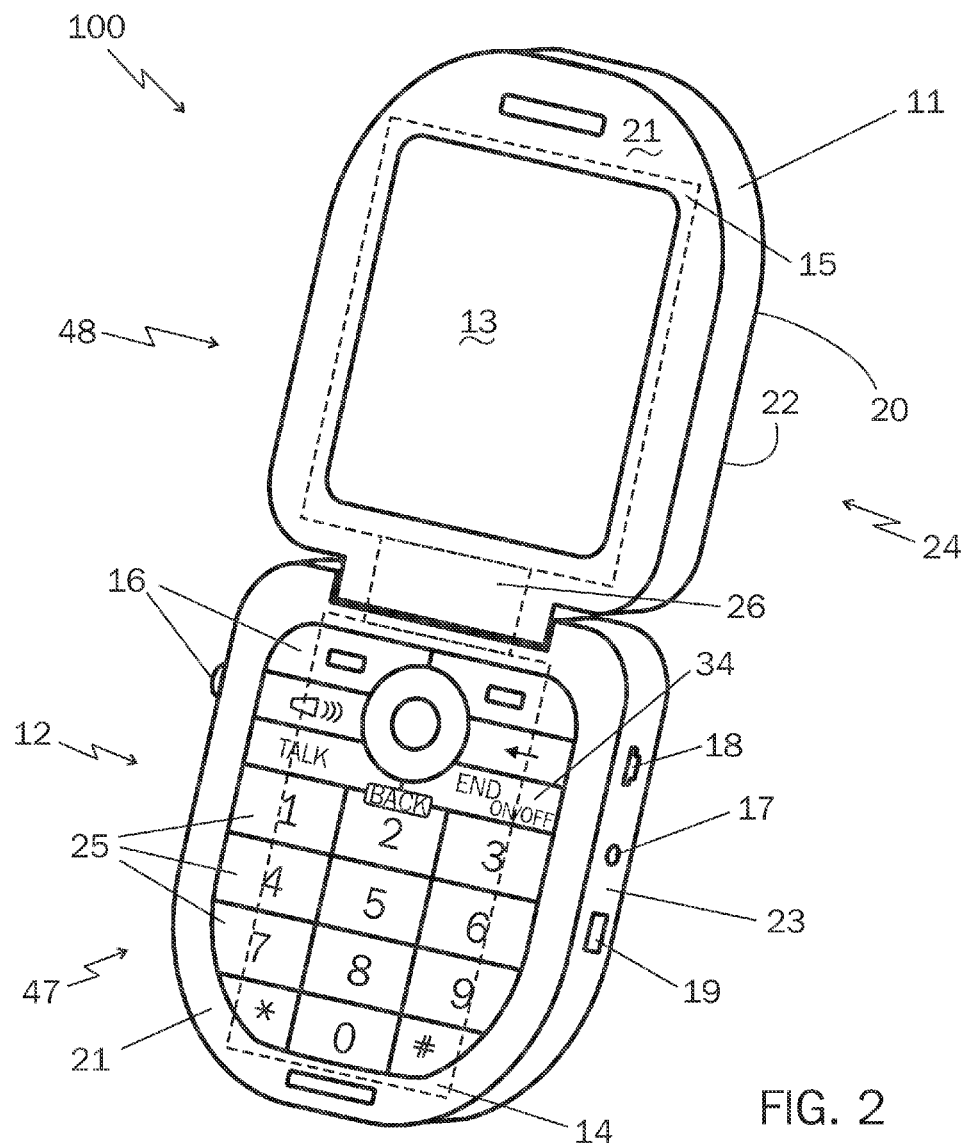
FIG. 2 is a perspective view of a portable electronic device showing the various elements.

Referring now to FIGS. 1A, 1B and 2, a security device for a portable electronic device is generally described by the number 10. The portable electronic device is designated by the number 100 and comprises a case 11, a keypad 12, at least one viewing/touch screen 13, a battery 14, an electronic circuit board 15, at least one function button 16, an audio output jack 17, a data input/output port 18, a charging port 19 and a photographic lens 20. Keypad 12 is disposed into a surface 21 of case 11 and viewing/touch screen 13 is disposed into, or visible through at least one surface 21, 22 of case 11. Battery 14 and electronic circuit board 15 are internally disposed within case 11 and are shown in dotted lines in FIG. 2. At least one function button 16, audio output jack 17, data input/output port 18 and charging port 19 are generally disposed into a peripheral edge 23 of an external surface 24 of case 11, however function buttons 16 also generally appear on keypad 12 as well. When provided, photographic lens is disposed into face 22 of external surface 24 of case 11. Keypad 12 further comprises a plurality of keys 25 for input of information for viewing on viewing/touch screen 13, display of receipt of information on viewing/touch screen 13 or transmission of information from electronic device 100. Viewing/touch screen 13 is adapted to display information input from keypad 12, or received by electronic device 100. It should be understood that information may be selected from the group consisting of text messages, photographic images, numbers, names, addresses, geographic location coordinates, operational icons, operational words, graphic images, status images, formulae, data input formats or combinations thereof, though information is not limited to the recitations above.

Referring now specifically to FIGS. 1A and 1B, security device 10 is adapted to replace at least a portion 47 of case 11 where case 11 may comprise multiple parts such as fixed portion 47 and movable portion 48 of a flip phone as shown in FIG. 2 or slidable keyboard phone well known in the art, wherein fixed portion 47 and/or movable portion 48 may further comprise front and back inner casings and front and back outer covers. However, for the sake of brevity and clarity, the elements of this invention will be restricted to the description of only fixed portion 47 though it is fully understood that the descriptions with respect to fixed portion 47 equally apply to movable portion 48. Security device 10 thus comprises at least one replacement portion 47' identical in every respect to portion 47 but provided with a plurality of security access buttons 27 recessed into depressions 28 with means for finger/digit contact on at least a portion 29 of external surface 24 thereof wherein more than one security access button 27 requires continual contact of a pad of at least two digits of at least one hand or up to four digits of both hands of a user of electronic device 100 for operation of electronic device 100. Portion 47' comprises front half 65 and back half 67 wherein inside views 66, 68 thereof are shown in FIG. 1A while external surface 22 is shown in FIG. 1B. Inside surfaces 30 of halves 65, 67 of portion 47' of security device 10 are shown in FIG. 1A wherein wiring 31 is routed from switches 32 positioned on internal surface 30 behind security access buttons 27 on portion 29 of external surface 24. Though wiring 31 is shown in both halves 65, 67 of portion 47' of security device 10, wiring 31 may be provided in only one half 65, 67 of portion 47', however, as front half 65 of portion 47' is adapted to fit a front half of fixed portion 47 of case 11 or back half 67 of portion 47' is adapted to fit or replace a back half of portion 47 of case 11, generally only one half of portion 47 need be replaced by front half 65 or back half 67 of portion 47' of security device 10. Wiring 31 is preferably linked to circuit board 15 with a data plug 37 directly into data input/output port 18 or with a cable link 38 with a data plug 37 at the end thereof, shown in dotted lines, such that security access buttons 27 are integrated into the operation of electronic device 100. As such, security access buttons 27 with means for finger/digit contact may be integrated into one of the function buttons 16, for instance, an on/off button 34 shown on the right hand side of key pad 12 wherein an owner or person responsible for safe operation of electronic device 100 may program security access buttons 27 to permit turning on of electronic device 100 only when all programmed security access buttons 27 are depressed and held. As such, when any security access button 27 is released, operation of electronic device 100 ceases as it is turned off by being integrated with on/off button 34. Of course, an owner or person responsible for safe operation of electronic device 100 may program security access buttons 27 to allow or prevent keypad operation, screen touching, page turning, screen operation, operation of portions of the keyboard, viewing screen operation, use of a microphone, speaker, Internet access, video/photographic actions, GPS access or viewing, Bluetooth use, hands-free use, emergency communications, other available functions within the electronic device or any combination thereof. Programming by an owner or person responsible for safe operation of electronic device will be fully described hereinafter with reference to FIGS. 9A through 9G. Use of electronic device 100 with activated security access buttons 27 will also be fully described hereinafter with reference to FIGS. 10A-10C.

Figures 11, 12:
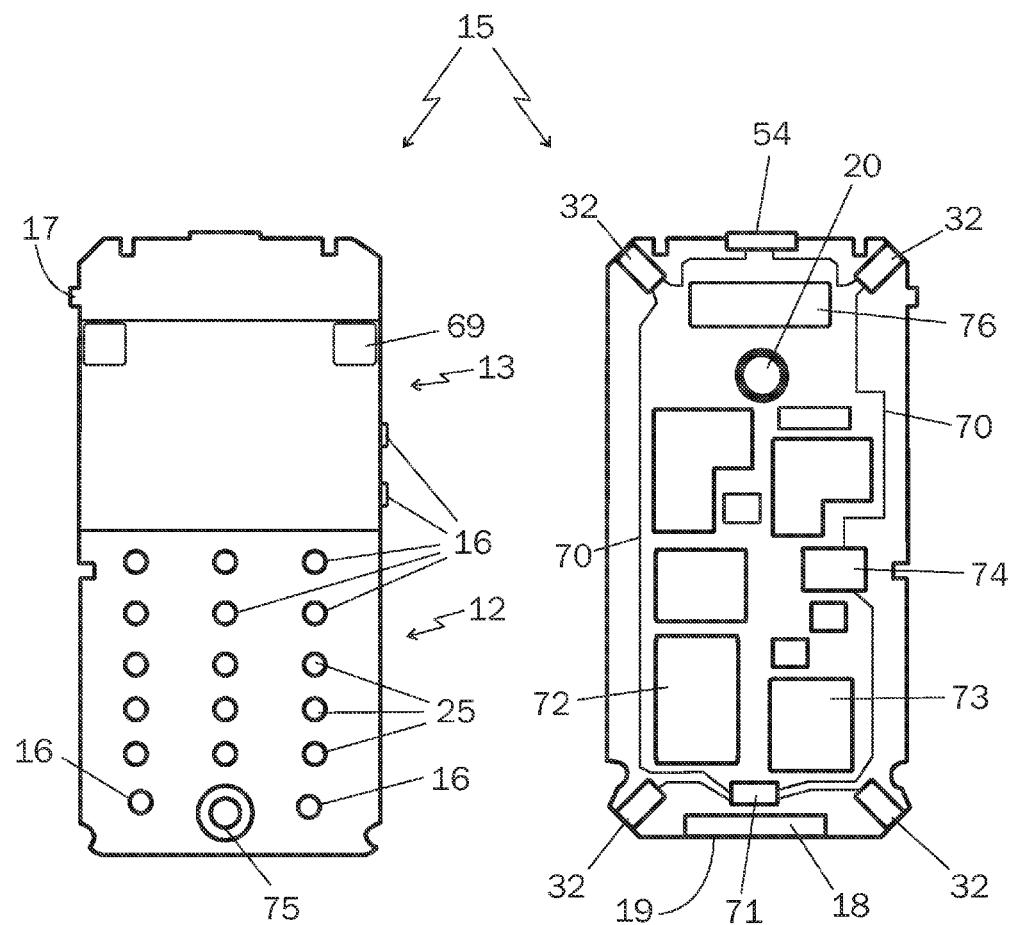
FIG. 11 is a rear view of a circuit board provided with the plurality of security access buttons of this invention.
FIG. 12 is a front view of a circuit board showing a key pad and viewing screen, the circuit board provided with at least one security access button and the viewing screen showing at least one security access icon button of this invention.

Referring first to FIGS. 11 and 12, circuit board 15 is shown removed from electronic device 100 and carries thereupon keypad 12, viewing/touch screen 13, function buttons 16, audio output jack 17, data input/output port 18, charging port 19 and photographic lens 20. Circuit board 15 in FIGS. 11 and 12 is from a simple cellular telephone however it should be fully understood that security access buttons 27 of this invention may be adapted to any circuit board of any electronic device 100 and thus circuit board 15 is merely representative. Circuit board 15 of the instant invention is provided with switches 32 protruding from circuit board 15 near the orthogonal corners thereof, switches 32 aligned with security access buttons 27 in depressions 28 provided in a new case similar to case 11. Switches 32 disposed on circuit board 15 are preferably secured directly to circuit board 15 and thus have integral traces 70 connecting switches 32 to at least one integrated circuit chip 71 of circuit board 15. Thus, switches 32 for security access buttons 27 are integral with circuit board 15, its memory 72, GPS 73, battery connector 74 and other operational components 12, 13, 17, 18, 19 and 20 thereof in order that security access buttons 27 are functional as intended as described herein. Additionally, glowing components of switches 32 may be powered directly from battery connector 74 and especially, emergency button/slide 54 such that the security access system (SAS) of this invention may be "live" even if electronic device 100 is powered off. Though it is preferred that switches 32 and emergency button/slide 54 be directly connected to integral circuit traces 70 of circuit board 15, it is fully within the scope of this invention to anchor switches 32 and emergency slide/button 54 to circuit board 15, connect these components together with wires 31 as in FIG. 1A and thereafter connect the SAS to at least one IC chip 71 to electrically associate the SAS to electronic device 100. Though switches 32 have been described above, it is also within the scope of this invention to provide icon buttons 69 on viewing/touch screen 13 wherein icon buttons 69 function as security access buttons 27. In fact, it is possible within the scope of this invention to provide both security access buttons 27 and icon buttons 69 to provide for the safe operation of electronic device 100 especially as related to a vehicle.

Since certain keys 16, 25 would not normally be used for certain activities of electronic device 100, it is within the scope of this invention to program security access functions into keys 16, 25 thus making keys 16, 25 function as security access buttons 27. For instance, use of keyboard 12 is not required while speaking into microphone 75, using photographic lens 20, listening to a conversation through speaker 76, hands free use or wireless speaker/microphone operation and thus keys 25 of keyboard 12 may be programmed as security access buttons 27. Likewise, function keys 16 are usually not used while accessing messages for viewing or operation of keyboard 12 for texting and the like and thus function keys 16 may be programmed as security access buttons 27.

It is also within the scope of this invention to provide a DIP switch module 35 for programming by a person responsible for safe operation of electronic device 100 wherein DIP switch module 35 is inserted into wiring 31 wherein setting of the switches on the DIP switch module 35 determines which security access buttons 27 are designated as active access buttons 27. DIP switch module 35 may be preprogrammed by a manufacturer of security device 10, programmed and installed at a point of sale by the seller or programmed by a person responsible for safe operation of electronic device 100 with security device 10 also installed by the person responsible for safe operation of electronic device 100. Likewise, an IC chip 36 may be inserted into wiring 31 wherein IC chip 36 is provides for safe operation of electronic device 100, IC chip 36 electronically connected to circuit board 15 to permit operation of electronic device 100 when designated active security access buttons 27 are held down. IC chip 36 may be preprogrammed by a manufacturer of security device 10, programmed and installed at a point of sale by the seller or programmed and installed by a person responsible for safe operation of electronic device 100 through keypad 12, data input/output port 18, a touch screen integrated into display screen 13 or electronic wave transmission directly through security device 10 to IC chip 36. Some methods of setting security access buttons 27 include, programming IC chip 36 or DIP switches 35 by depressing security access buttons 27 in a particular sequence followed by simultaneously depressing at least two security access buttons 27 which then locks security access buttons 27 for later operation. Alternately or additionally, IC chip 36 or DIP switches 35 may be programmed in a particular sequence, locked in that sequence which requires the user of the electronic device 100 to depress security access buttons 27 in that sequence in order to operate electronic device 100. It is also within the scope of this invention to integrate IC chip 36 into electronic circuit board 15 or to integrate programming of security access buttons 27 into existing circuitry of circuit board 15. Of course, the methods hereinbefore described for setting active security access buttons 27 are not limited thereto and thus other methods of setting active security access buttons 27 are fully within the scope of this invention. Security device 10 is preferably provided with a primary function button 54 that has an emergency position, which when pressed, allows emergency contact with an universal emergency service only without requiring designated active security access buttons 27 to be pressed and held.

Various security devices 10 may be made for use with portable electronic devices 100 selected from the group consisting of telephones, computers, calculators, readers, multifunctional touch screens, notebooks, notepads, note tablets, digital cameras, video consoles or combinations thereof such that these electronic devices 100 may be safely operated in a moving vehicle by persons other than the driver. In each different security device 10, security access buttons 27 may be provided at locations not herein described, however, it has been found by the inventor hereof that the corners and edges of security device 10 provide ample space for security access buttons 27. Of course, other portable electronic devices 100 not described above and which may be developed in the future also may have security device 10 adapted thereto to ensure safe operation thereof.

As hereinbefore stated, security access buttons 27 require continual contact in order for electronic device 100 to be operated though all security access buttons 27 need not be contacted. As such, certain of security access buttons 27 are designated active security buttons 27 by an owner responsible for safe operation of electronic device 100 by a user thereof. Security access buttons 27 are preferably arranged at the four corners 39-42 and along at least one of edges 43-46 of peripheral edge 23 of external surface 24. The owner or responsible person may designate security access buttons 27 at diagonally opposed pairs 39, 41 or 40, 42 or at opposed pairs 39, 40 or 41, 42 of corners 39-42 on one end as designated active buttons 27. Alternately, the owner or responsible person may designate security access buttons 27 at one diagonal pair 39, 41 or 40, 42 and another corner 39-42 of one end 45, 46 as designated active buttons 27. In another alternate arrangement at least one security access button 27 with means for finger/digit contact on one side edge 43, 44 and at least one security button 27 on another edge 45, 46 are designated as active security access buttons 27. In another configuration of security access buttons 27, opposed pairs of edges 43, 44 or 45, 46 of peripheral edge 23 have security access buttons 27 therein that are designated active buttons 27. In yet another configuration, one security access button 27 at one of corners 39-43 and one security button 27 on one edge 43-46 are designated active security access buttons 27. Still another arrangement has one security access button 27 on one edge 43-46 and a plurality of security access buttons 27 at corners 39-42 are set as designated active security access buttons 27. Though the above described modes of providing designated security access buttons 27 are all likely configurations, it is fully understood that multiple other combinations are possible without departing from the scope of this invention. For instance, with reference to FIG. 8, active security access buttons 27 may be arranged in pairs on opposite sides of portion 29 such that thumb and forefinger must be used to depress security access buttons 27 to access electronic device 100. Additionally, some security access buttons 27 may be arranged as icon buttons 69 on viewing/touch screen 13 requiring constant contact with icon buttons 69 on viewing/touch screen 13 and security access buttons 27 on back surface 22 in order to operate electronic device 100. By programming two pairs of security access buttons 27 to be active security access buttons 27, it is virtually impossible to operate any other device than electronic device 100. Most combinations will likely work for most persons, however, an owner responsible for safe operation of electronic device 100 will likely consider the hands of the user of electronic device 100 in programming designated active security buttons 27 as some hands may not be able to depress certain of security access buttons 27 while holding electronic device 100. Still another programming technique is to provide that where fewer than four security access buttons are designated active, pressing any other security access button 27 interferes with operation of electronic device 100. Additionally, an owner may further program the device to allow or prevent keypad operation, screen touching, page turning, screen operation, operation of portions of the keyboard, viewing screen operation, use of a microphone, speaker, Internet access, video/photographic actions, GPS access or viewing, Bluetooth use, hands-free use, emergency communications, other available functions within electronic device 100 or any combination thereof.

Referring now to FIG. 3, security device 10 is shown as a wireframe security device 110 for surrounding portable electronic device 100, portable electronic device 100 comprising a case 11, a keypad 12, at least one viewing/touch screen 13, a battery 14 and an electronic circuit board 15. Portable electronic devices 100 usually having keypad 12 disposed into or projecting through a front surface 21 of front half 65 of fixed portion 47 of case 11 and viewing/touch screen 13 disposed into at least front surface 21 of front half 65 of fixed portion 47 of case 11, however, viewing/touch screen 13 may be disposed into front surface 21 and/or backside surface 22. Battery 14 and electronic circuit board 15 are internally disposed within one of portions 47, 48 of case 11 and thus are protected thereby. Case 11 usually further carries at least one function button 16, audio output jack 17, data input/output port 18 and charging port 19 arranged on a peripheral edge surface 23 thereof and may further have photographic lens 20 disposed into one planar face 21, 22. Wireframe security device 110 provides access to keypad 12, viewing/touch screen 13, battery 14, function buttons 16, output jack 17, input/output port 18, charging port 19 and photographic lense 20 as wireframe security device 110 comprises corner portions 49 joined together with securing straps 50 which are adapted to reduce wireframe security device 110 to snugly surround a selected portable electronic device 100. Since securing straps 50 are relatively small in nature so that access to function buttons 16, audio output jack 17, data input/output port 18 and charging port 19 is readily available. Wireframe security device 110 further comprises a plurality of security access buttons 27 recessed into depressions 28 at each of corner portions 49, security access buttons 27 requiring continual contact of a pad of at least two digits of at least one hand or up to four digits of both hands of a user of portable electronic device 100 for safe operation thereof thus preventing use of portable electronic device 100 by a driver of a vehicle while the driver has hands thereof occupied by the task of driving the vehicle.

Securing straps 50 of wireframe security device 110 are preferably elongated strips of material having at least one pawl surface thereupon wherein pawl surface is adapted to be passed through a ratchet slot such that securing straps 50 are adjustable in a reducing direction only. Thus, wireframe security device 110 has adjustable sides 43, 44 and adjustable ends 45, 46, for adjustably surrounding portable electronic device 100 and being secured thereto. Adjustable securing straps 50 may also be conductors thus being capable of electrically joining corners 49 together. Internal surfaces 51 of corners 49 are preferably concave in contour such that corners 49 conform to external surface 24 of case 11 of portable electronic device 100. Internal surface 51 of at least one corner 49 may further be provided with a DIP switch 35 or IC chip 36 for electrically connecting security access buttons 27 together and to portable electronic device 100. One of corners 49 may be provided with a pigtail conductor 52 that has a plug 53 on a free end thereof for connecting wireframe security device 110 to portable electronic device 100. Plug 53 may be adapted to fit audio output jack 17, charging port 19 or data input/output port 18 and further may carry a female component identical to the component into which plug 53 is fitted in order to provide user access to the function provided by the component covered by plug 53. Programming of designated active security access buttons 27 may be done as described, however, it is fully within the scope of this invention to electronically associate security access buttons 27 with keyboard 12 of electronic device 100 to ensure a safe operation of portable electronic device 100. It is also within the scope of this invention to have security access buttons 27 with means for finger/digit contact electronically associated with circuit board 15 such that keypad 12 may be used to program designated active security access buttons 27.

Though security access buttons 27 have been described as associated with corners 49 of wireframe security device 110, security access buttons 27 may also be disposed at selected locations along a peripheral extent of wireframe security device 110 such as shown on left hand side edge 43 thereof. Though only one security access button 27 is shown on side edge 43, other side edges 44-46 may be so provided. Wireframe security device 110 may further be provided with primary function switch 54, having an emergency button function which when pressed or slid sideways, allows emergency contact with an universal emergency service or predesignated contacts only without requiring designated active security access buttons 27 to be pressed and held. Preferably, each of adjustable security straps 50 is individually adjustable in length by pulling a free end 55 thereof through a ratchet aperture, not shown but well known, until the selected security strap 50 is fully engaged with the side edge 43-46 with which it is associated. Fully securing of wireframe security device 110 to electronic device 100 proceeds with tightening each security strap 50 in the same manner until all security straps 50 are reduced in length to snugly surround portion 47 and/or 48 of portable electronic device 100. Though portable electronic device 100 has been described as having one or two portions 47, 48, wireframe security device 110 may manufactured to fit any portable electronic device 100 that has a configuration selected from the group consisting of display over vertical keyboard, display over horizontal keyboard, left hand keyboard/right hand display, right hand keyboard/left hand display, display between split horizontal keyboard, display between split vertical keyboard, single longitudinal fold out, single longitudinal slide out, double longitudinal fold out, double longitudinal slide out, multi-touch screen keyboard/display or combinations thereof.

Referring now to FIG. 4, security device 10 may be a molded security device 210 for surrounding portable electronic device 100. Molded security device 210 is adapted to fit snugly over fixed portion 47 of case 11 of portable electronic device 100, however molded security device 210 may further comprise additional housings for fitting to movable portions 48 of case 11. Keypad 11 and viewing/touch screen 13 of portable electronic device 100 are retained in case 11 though access to battery 14 and electronic circuit board 15 may be inhibited. Function button(s) 16, audio output jack 17, data input/output port 18 and charging port 19 are accessible through apertures 56 disposed through a peripheral edge 57 of molded security device 210. Where molded security device 210 also is adapted to be fitted over movable portion 48 of case 11 or wherein case 11 is fully comprised of fixed portion 47 and case 11 is provided with photographic lens 20 disposed into planar face 22 thereof, molded security device 210 has an aperture 56 provided through planar face 22. Molded security device 210 for surrounding case 11 of portable electronic device 100 also comprises a plurality of security access buttons 27 recessed into depressions 28 in at least a portion 29 of external peripheral surface 24 of molded security device 210 wherein security access buttons 27 require continual contact of a pad of at least two digits of at least one hand or up to four digits of both hands of a user of portable electronic device 100 for operation thereof. Since many configurations of portable electronic device 100 exist, apertures 56 may be provided in other locations of external peripheral surface 24 or backside planar face 22. Additionally, where portion 48 is fitted with molded security device 210, apertures for access to components is also provided in peripheral edge 24 thereof. As with security device 10 of the preferred embodiment, wireframe security device 110 and form fitting security device 310 hereinafter described, molded security device 210 may be provided with wires 31 connecting switches 32 together as well as connecting to DIP switches 35, IC chips 36, cable link 38 and/or data plug 37 thus providing association of security access buttons 27 with electronic device 100 through any or all of data input/output port 18, charging port 19, audio output port 17 or any other direct link to electronic circuit board 15.

Molded security device 210 is adapted to snap fit over case 11 and have sufficient gripping strength to effectively prevent removal thereof for the purpose of defeating the objects of this invention. Direct connection of wiring 31 of molded security device 210 is preferably accomplished prior to snap fitting molded security device 210 over case 11 thus linking security access buttons 27 directly to electronic circuit board 15 for programming of designated active security access buttons 27. Programming of designated active security access buttons 27 may also be effected by loading programming software into electronic circuit board 15 through any of data input/output port 18, charging port 19, audio output port 17 or any other direct link to electronic circuit board 15 whereupon keypad 12 of electronic device 100 may be used to set designated active security access buttons 27. Of course, it is also fully within the scope of this invention to provide molded security device 210 with wiring 31 connecting switches 32 to electronic circuit board 15 and thereafter programming designated active security access buttons 27 using a separate programming device connected to portable electronic device 100 through one of data input/output port 18, charging port 19, audio output port 17 or any other direct link to electronic circuit board 15. Programming and/or activation of designated active security access buttons 27 may be password protected such that only the owner or person responsible for safe operation of electronic device 100 controls access to various functions by a user thereof. Thus, password protection allows the owner or person responsible to allow or prevent the user from accessing keypad operation, screen touching, page turning, screen operation, operation of portions of the keyboard, viewing screen operation, use of a microphone, speaker, Internet access, video/photographic actions, GPS access or viewing, Bluetooth use, hands-free use, emergency communications, other available functions within electronic device 100 or any combination thereof.

Referring now to FIG. 5, security device 10 may be a form fitting security device 310 for surrounding portable electronic device 100. Form fitting security device 310 comprises a telescoping front and back framework 58 with a flexible membrane 59 connected thereto. Flexible membrane 59 may comprise a full surface between front and back framework 58 or may be connected thereto in short sections 60. Form fitting security device 310 is adapted to fit snugly around fixed portion 47 of case 11 of portable electronic device 100, however form fitting security device 310 may further comprise additional components for flexibly fitting around movable portions 48 of case 11. Function button(s) 16 may be accessed directly through flexible membrane 59 while audio output jack 17, data input/output port 18 and charging port 19 are accessible through apertures provided in flexible membrane 59 or between sections 60 thereof. Access to battery 14 and electronic circuit board 15 is uninhibited as form fitting security device 310 fits around the periphery of case 11. Form fitting security device 310 for surrounding case 11 of portable electronic device 100 also comprises a plurality of security access buttons 27 recessed into depressions 28 with means for finger/digit contact in at least corner portions 29 of molded security device 210 wherein security access buttons 27 require continual contact of a pad of at least two digits of at least one hand or up to four digits of both hands of a user of portable electronic device 100 for operation thereof. As with security device 10 of the preferred embodiment, wireframe security device 110 and molded security device 210, form fitting security device 310 may be provided with wires 31 connecting switches 32 together as well as connecting to DIP switches 35, IC chips 36, cable link 38 and/or data plug 37 thus providing association of security access buttons 27 with electronic device 100 through any or all of data input/output port 18, charging port 19, audio output port 17 or any other direct link to electronic circuit board 15. In form fitting security device 310, wires 31 may be placed along components of telescoping framework 58 while switches 32, DIP switches 35 or IC chips 36, if employed, are disposed in corners 49 along with security buttons 27 disposed into depressions 28, switches 32, DIP switches 35 or IC chips 36 arranged on an inside surface 61 of corners 49 with security buttons 27 disposed on external surface 62 thereof. Telescoping framework 58 of form fitting security device 310 is adapted to be telescopically collapsed upon portable electronic device 100 as shown by arrows 63.

Security device 10, and variations thereof hereinbefore described, preferably has a primary function switch 54 to select between emergency use for activating a call to emergency responders or for normal access to portable electronic device 100 wherein normal access to electronic device 100 is a default setting to which function switch 54 returns. Once primary function switch 54 is no longer used for emergency service, designated active security access buttons 27 must be used in order to operate portable electronic device 100. Preferably, security access buttons 27 are different in color from primary function button 54 such that primary function button 54 can be readily identified in case the emergency function of portable electronic device 100 is needed.

Referring now to FIG. 6, security device 10, and variations thereof hereinbefore described, have security access buttons 27 recessed into depressions 28 on at least a portion 29 of external surface 24 of security device 10 as hereinbefore set forth. One primary purpose of recessing security access buttons 27 into depressions 28 is to prevent attempting operation of portable electronic device 100 by pressing same against a solid object or attaching a mechanical device like a clamp or strap at the locations where security access buttons 27 are located. Since security access buttons 27 are essentially below external surface 24 and must be depressed further in order to actuate security access button 27, the objective of preventing use by pressing against a surface is achieved. In FIG. 6 security access button 27 may have a shape selected from the group consisting of sphere, oval, cylinder, cone, pyramid, torus, cube, concave and convex or combinations thereof, an oval security access button 27 shown on corner 49 and a torus security access button 27 shown on side edge 43.

Though security access buttons 27 are preferably tactile requiring actual movement of security access button 27 in order to activate same, security access buttons 27 may alternately be provided with a surface 64 which detects contact by a human finger in order to effect operation of security access button 27. It is also within the scope of this invention to have tactile security access buttons 27 and contact security access buttons 27 on security device 10 as well as to provide tactile security access buttons 27 with contact surface 64.

Figure 7:
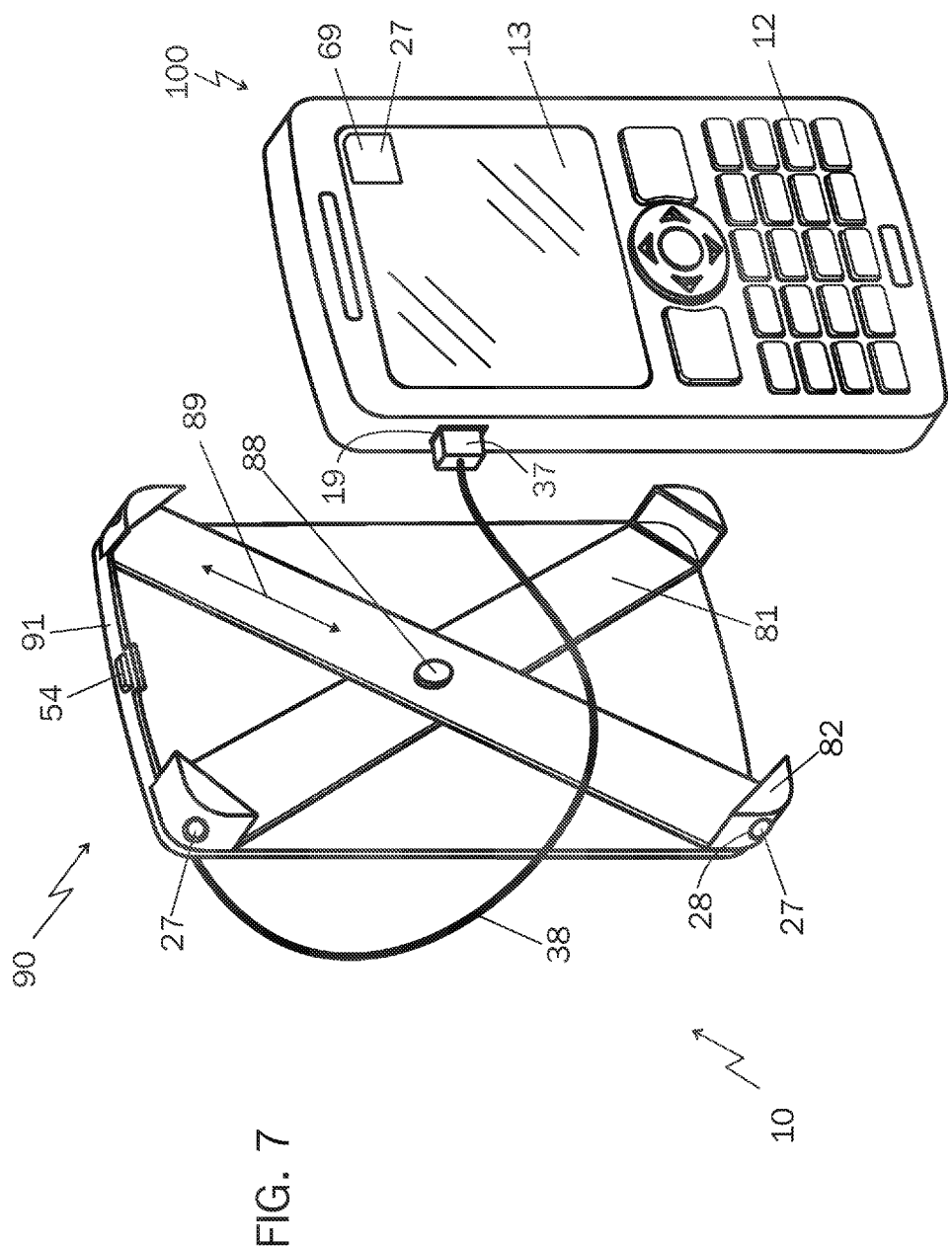
FIG. 7 is a perspective view of an alternate adjustable security device provided with security access buttons of this invention for use with an electronic device.

Referring now to FIG. 7, security device 10 may be an adjustable cross brace 90 wherein pivotable arms 81 are joined by a pivot 88. Each of pivotable arms 81 may also be adjustable in length from pivot 88 to hooks 82 as shown by adjustment arrow 89 thus making adjustable cross brace 90 may be fitted to a number of electronic devices 100 and therefore may be considered to be somewhat universal. Hooks 82 carry security access buttons 27 disposed into recesses 28 as hereinbefore recited and security access buttons 27 in hooks 82 are connected together through slidable contacts disposed on mating surfaces of sliding portions of arms 81 and are connected from security access button 27 in one hook 82 to a data port 19 of electronic device 100 through data port connector 37 attached to cable link 38. Emergency button 54 is also preferably adjustably associated with at least one hook 82 however, emergency button 54 may be fixed in position relative to one hook 82 and electrically associated therewith. Security access buttons 27 and emergency button 54 of adjustable cross brace 90 are connected to circuit board 15 of electronic device 100 and are therefore programmable by methods described herein. In addition, as electronic device 100 may also be provided with security access buttons 27 or touch screen icons 69, any combination of security access buttons 27, touch screen icons 69 of electronic device 100 and security access buttons 27 on hooks 82 of cross brace device 90 may be programmed for safe access to electronic device 100 while attempting multi-tasking. Adjustable cross brace 90 may also be used as a holster device 92 to be described elsewhere in this specification, adjustable cross brace 90 adapted to be secured to a rigid element such as a dashboard of a vehicle through pivot 88.

Figure 8:
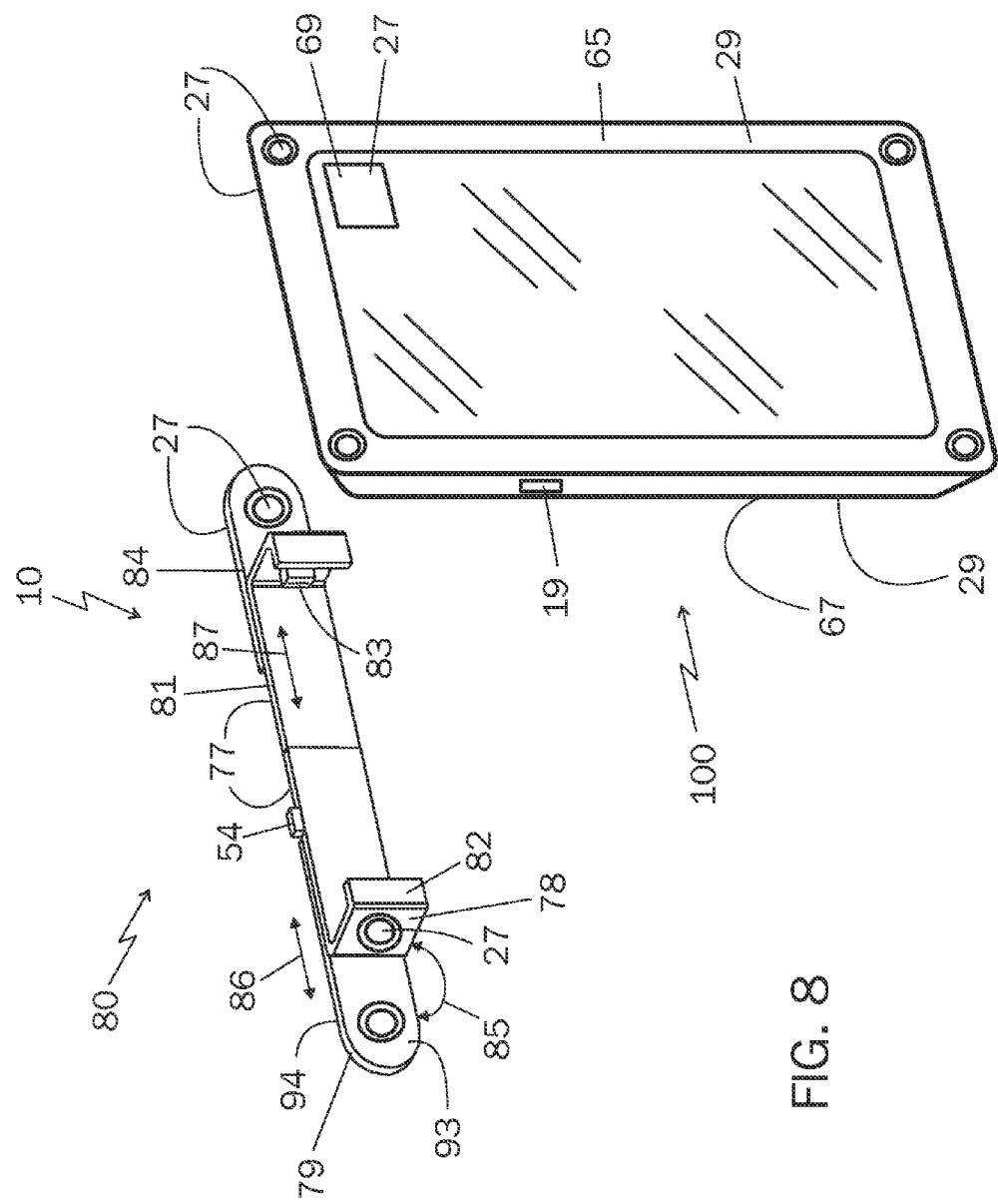
FIG. 8 is a perspective view of another alternate adjustable security device provided with security access buttons of this invention for use with an electronic device.

Security device 10 of FIG. 8 is a clamping device 80 wherein a pair of arms 81 are adjustable relative to a respective base element 84, arms 81 provided with security access buttons 27 thereupon. As shown by arrow 87, arms 81 are also adjustable relative to each other as arms 81 have slidable mating surfaces disposed into rearward surfaces 77 thereof. Each of arms 81 is terminated in a hook 82, one hook 82 provided with a fixed data port connector 83 adapted to mate directly with data input port 19 of electronic device 100. Clamping device 80 is inverted relative to electronic device 100 in order to show both data port connector 83 of clamping device 80 and data input port 19 of electronic device 100. Though data input port 19 is shown on a side of electronic device 100, it should be fully understood that data port 19 may be disposed in a bottom, top, back or front surface without departing from the scope of this invention. One hook 82, may be pivotable relative to arm 84 as shown by arrow 85. As arms 81 are adjustable relative to base 84, arms 81 adjustable relative to each other and hook 82 potentially pivotable relative to arm 81, clamping device 80 fits to a number of electronic devices 100 and therefore is somewhat universal. Though hooks 82 may carry security access buttons 27 in recesses 28 disposed into an external surface 78 thereof, preferably security access buttons 27 are associated with extensions 79 of base element 84 wherein security access buttons 27 are connected together through slidable contacts disposed on mating surfaces of sliding portions of arms 81 and base 84. Security access buttons 27 are preferably disposed into both front and back surfaces 93, 94 respectively of extensions 79 thus requiring finger digit contact therewith for safe operation of electronic device 100 while attempting to multi-task. Emergency button/slide 54 is also preferably associated with one base element 84 and electrically associated with slidable contacts within base element 84. Security access buttons 27 in extensions 79 are connected to data connector 83 and through data port connector 83, security access buttons 27 and emergency button 54 are connected to circuit board 15 of electronic device 100 and are therefore programmable by methods described herein. Furthermore, as electronic device 100 may also be provided with security access buttons 27 or touch screen icons 69, any combination of security access buttons 27, touch screen icons 69 of electronic device 100 and security access buttons 27 on extensions 79 of clamping device 80 may be programmed. Clamping device 80 may also be used as a holster device 92 to be described elsewhere in this specification.

Figure 13:
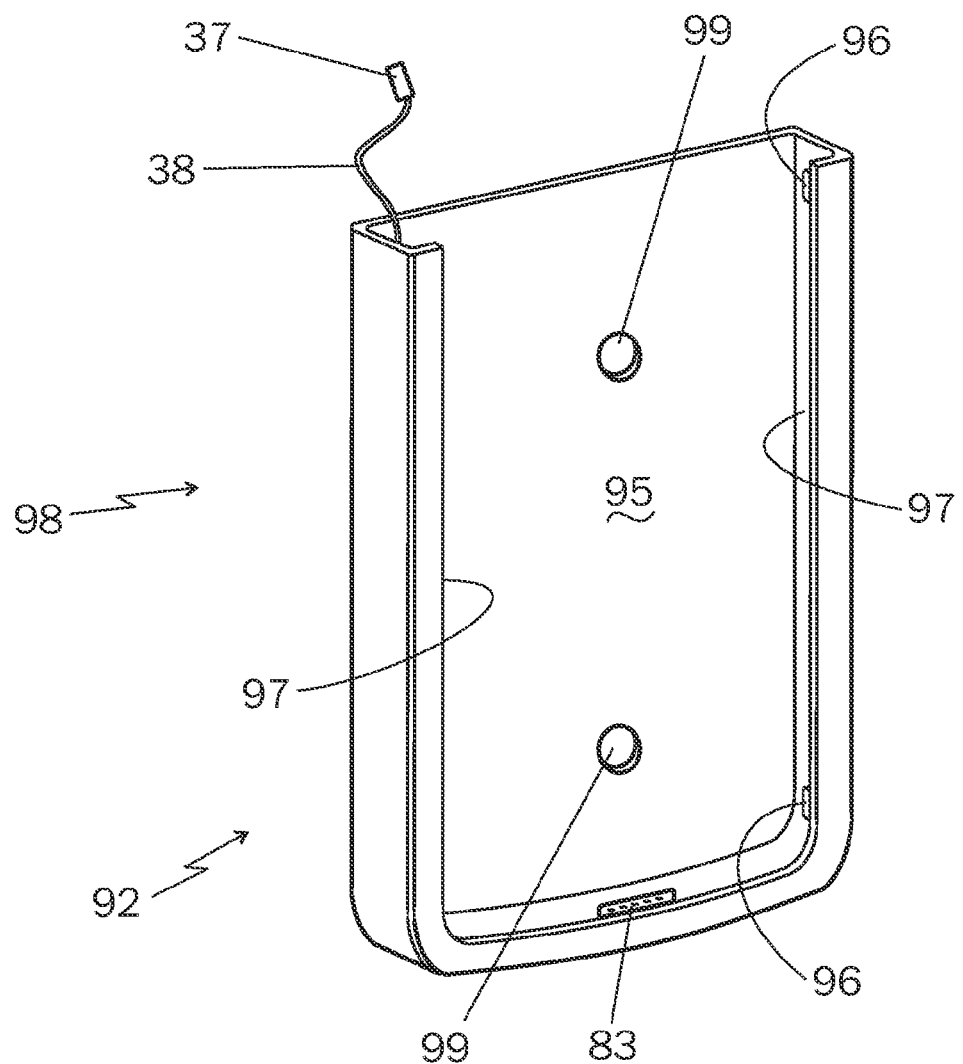
FIG. 13 is a perspective view of a holster device provided with means for holding certain security access buttons depressed.

Referring now to FIG. 13, holster device 92 is shown, holster device 92 comprises a shell 98 having inside width and depth dimensions substantially equal to outside width and thickness dimensions of electronic device 100 such that electronic device 100 may be captured in a cavity 95 of shell 98. Inside side edges 97 of cavity 95 are provided with protrusions 96 which are positioned in alignment with security access buttons 27 of electronic device 100 to permit limited use of electronic device 100 as described hereinafter. Shell 98 is also provided with mounting holes 99 such that holster 92 may be firmly attached to a rigid portion of a vehicle. Holster 92 is additionally provided with data port connector 83 in a bottom wall thereof and pigtail connector 38 terminated in data port connector 37. Thus, when electronic device 100 has data port 19 disposed into a bottom thereof, data port 19 is engaged with data port connector 83 when electronic device 100 is fully placed in cavity 95 and security access buttons 27 are engaged with protrusions 96. Optionally, when data port connector 19 is disposed on a side wall of electronic device 100, data port connector 37 is inserted into data port connector 19.

Figure 9A:
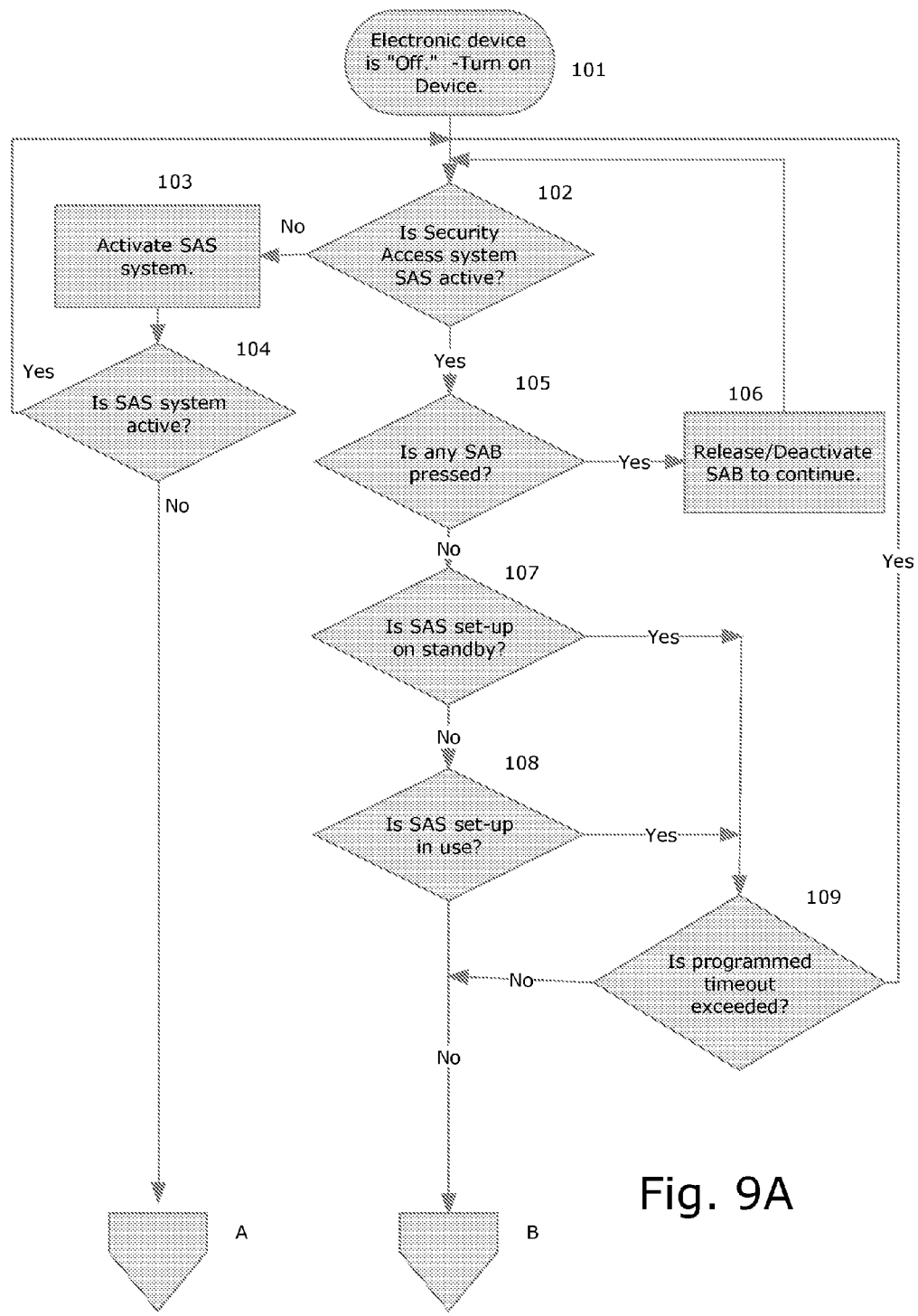
FIGS. 9A-9G comprise a flow chart spanning seven pages showing programming operations by a person responsible for the proper and safe use of an electronic device provided with the security access buttons of this invention.
Figure 9B:
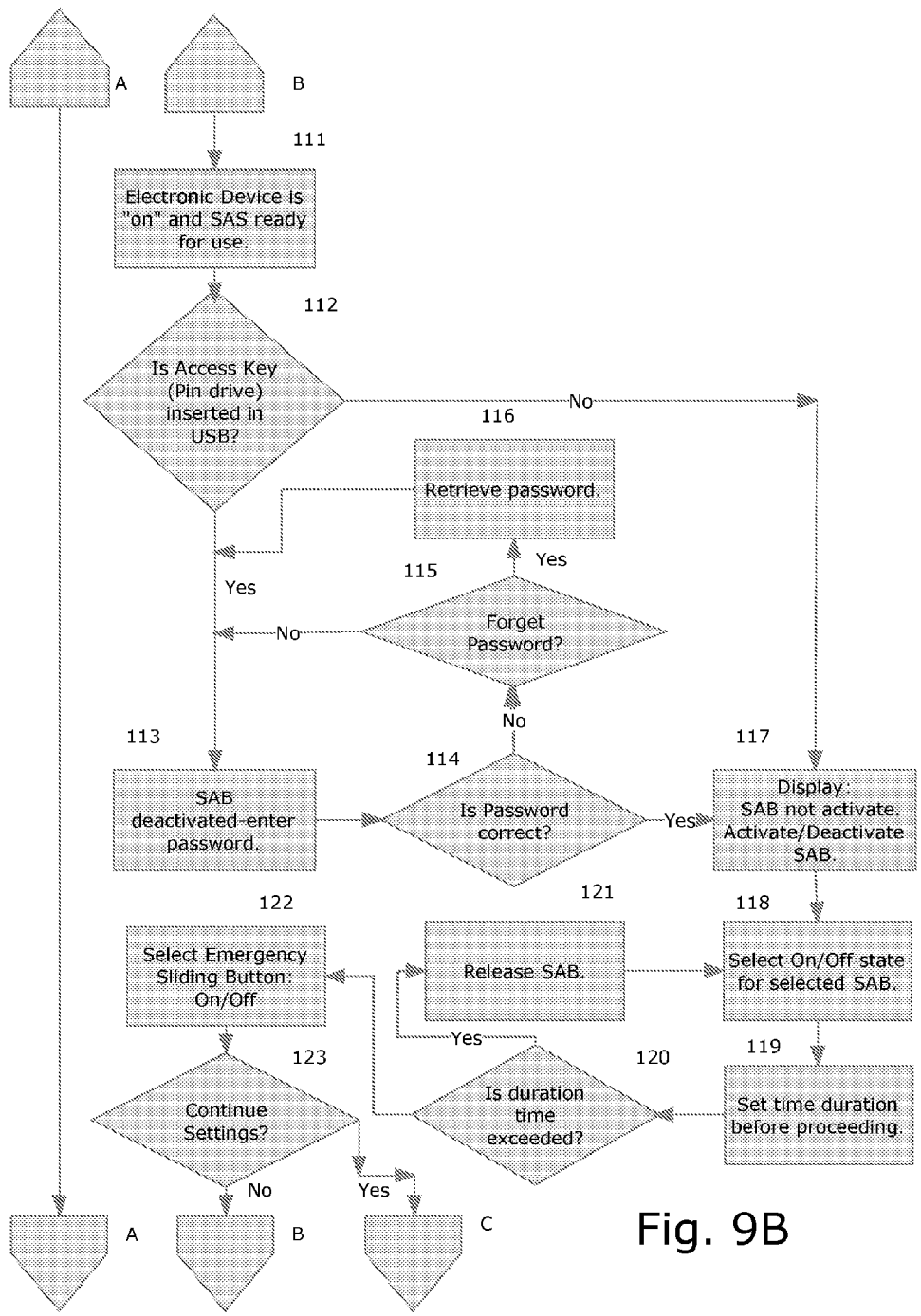
Figure 9C:
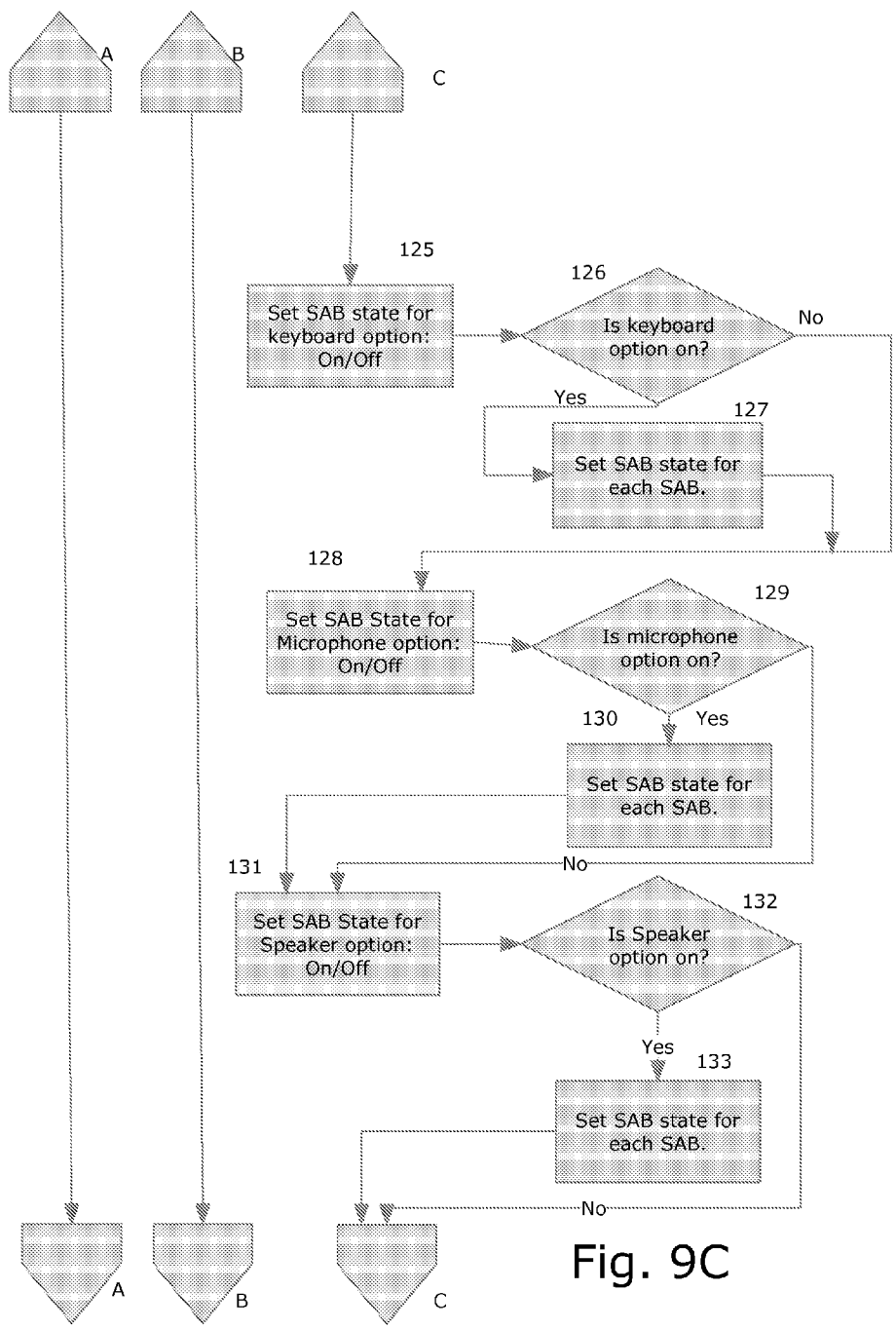
Figure 9D:
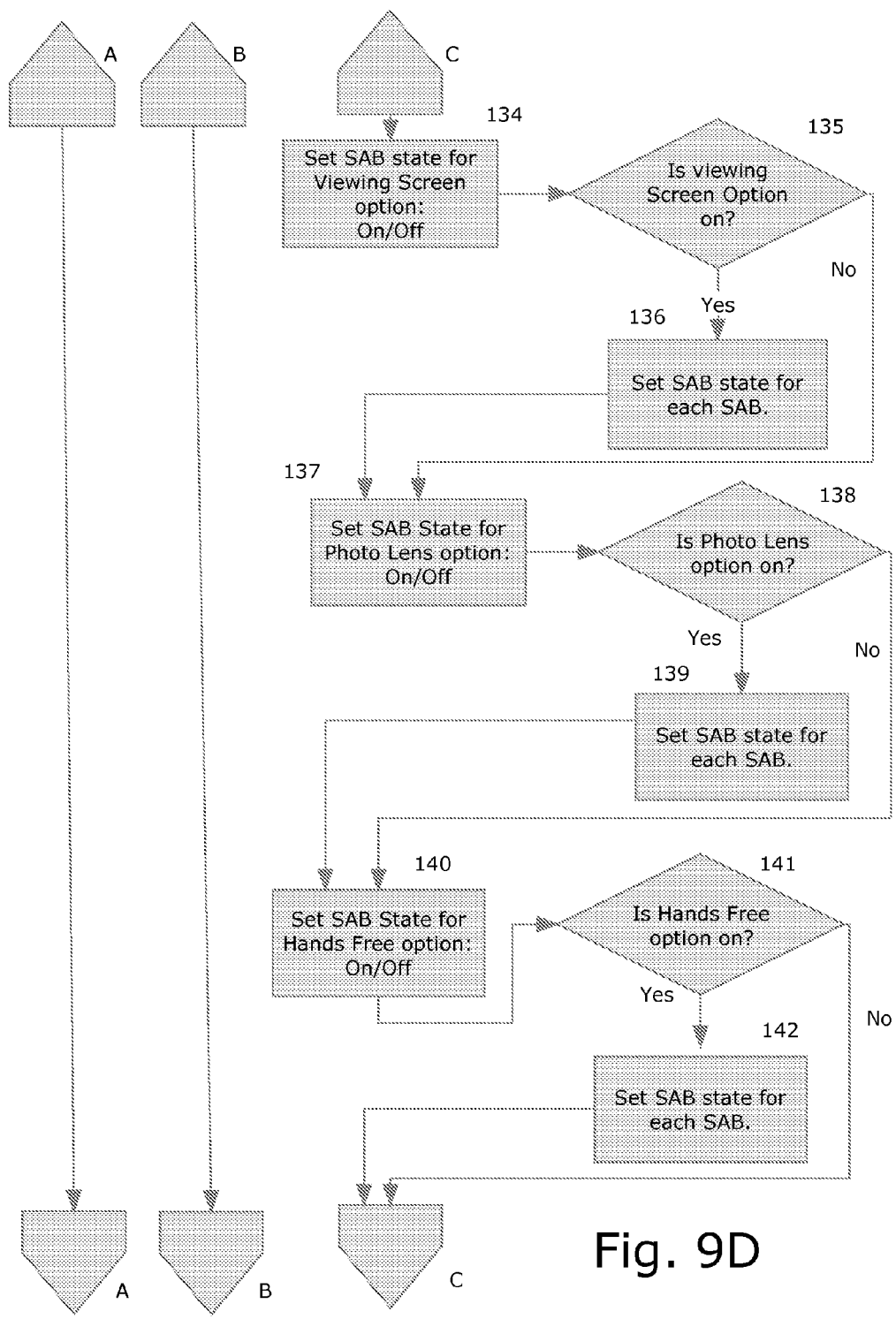
Figure 9E:
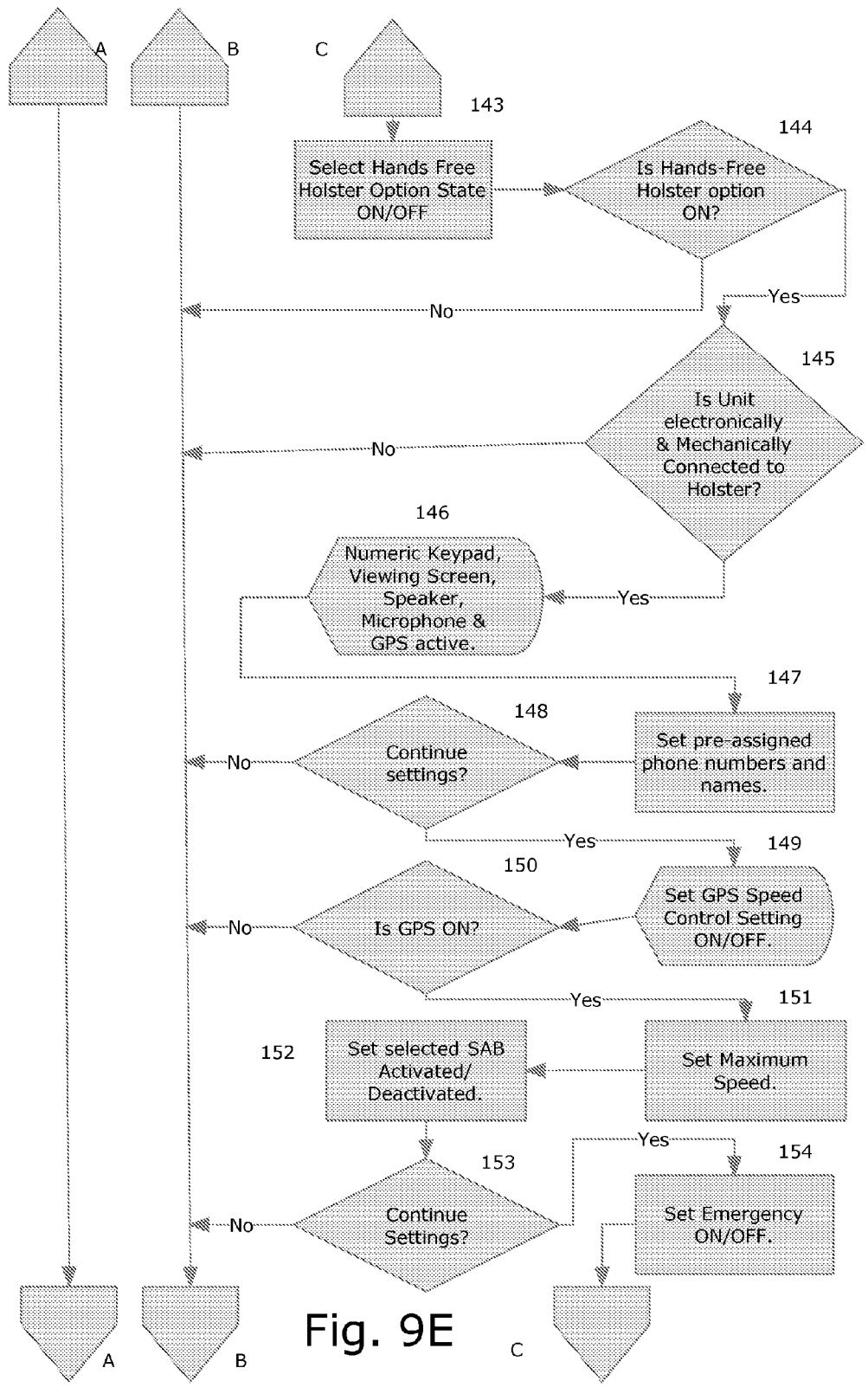
Figure 9F:
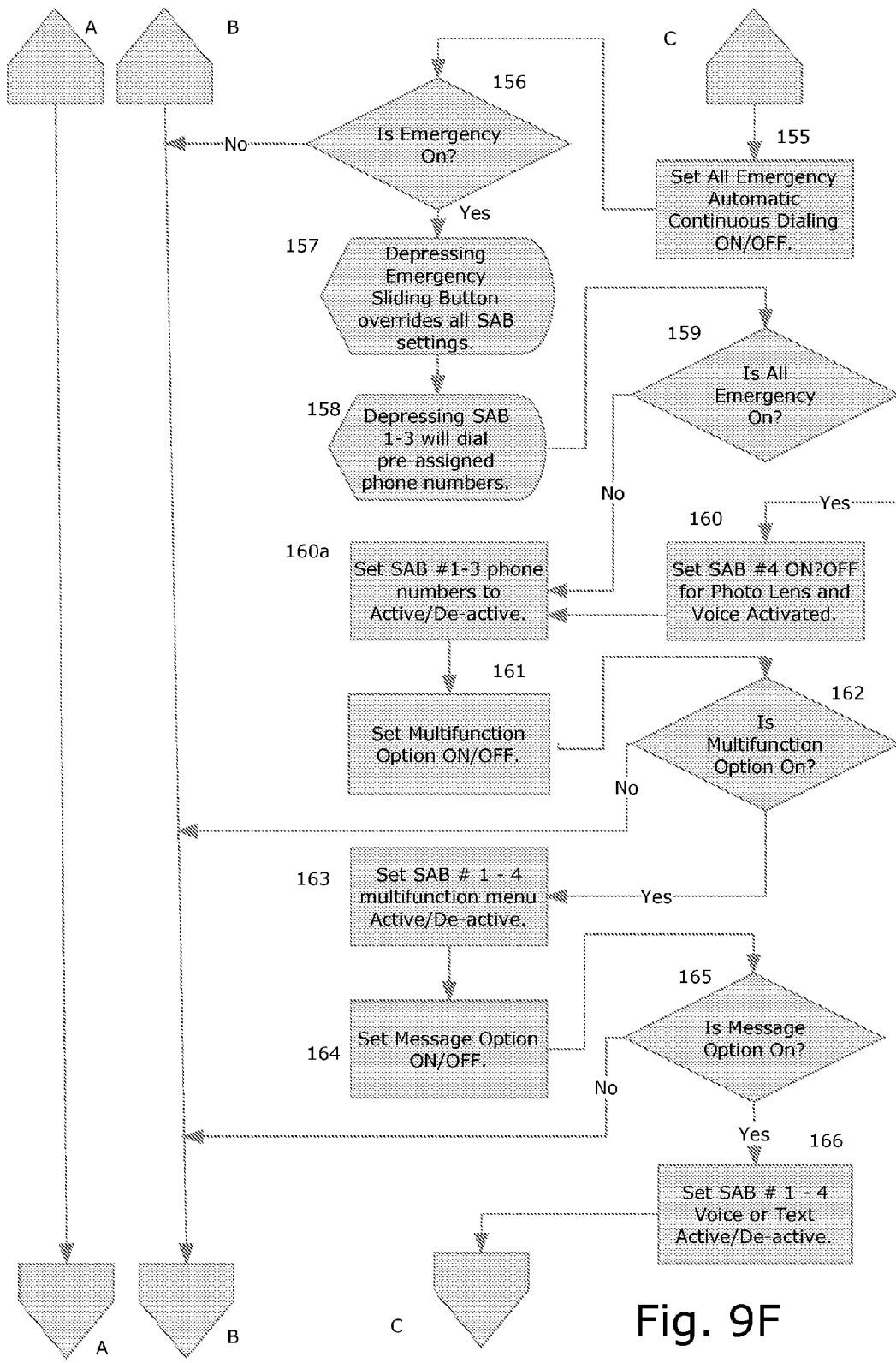
Figure 9G:
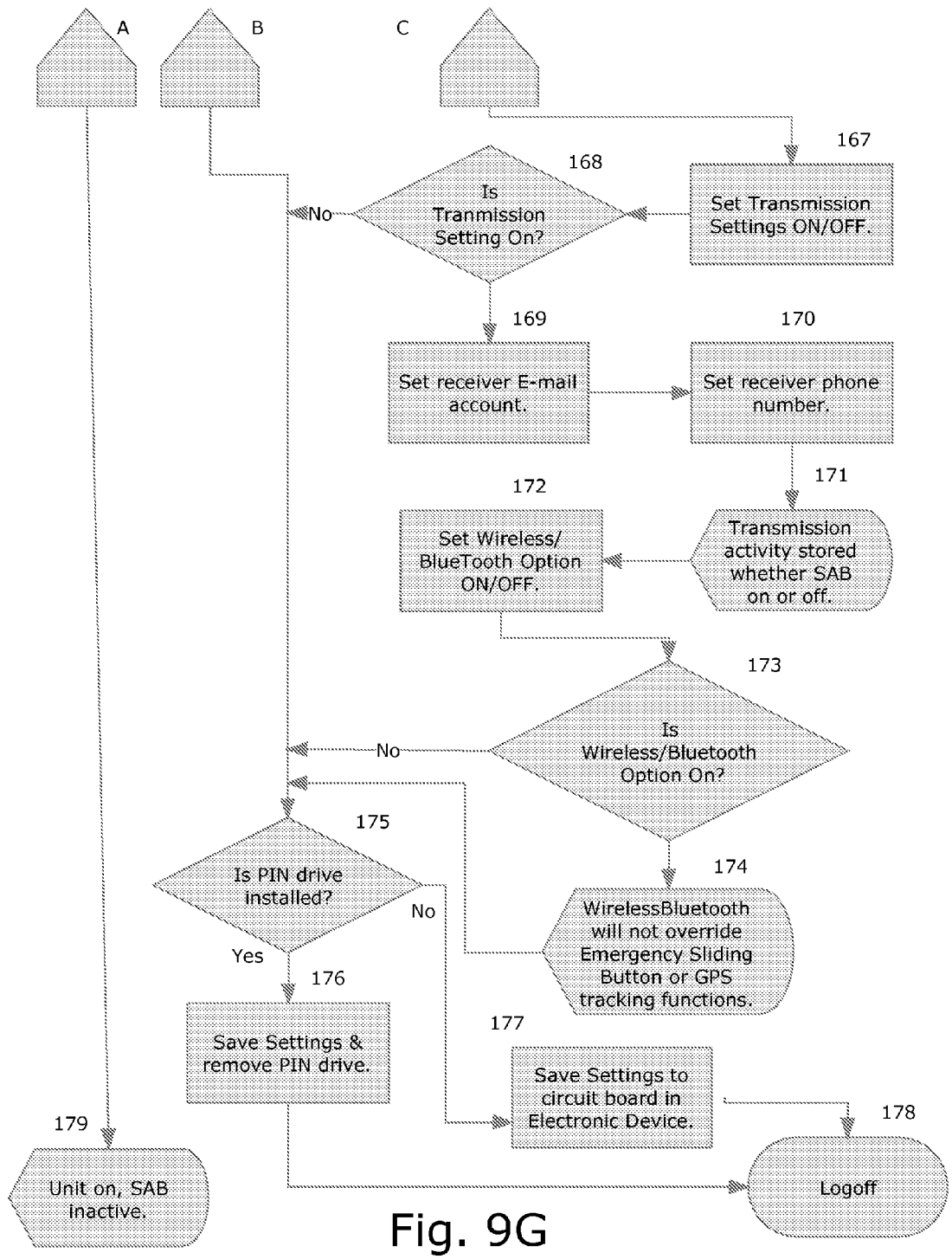
Figure 10A:
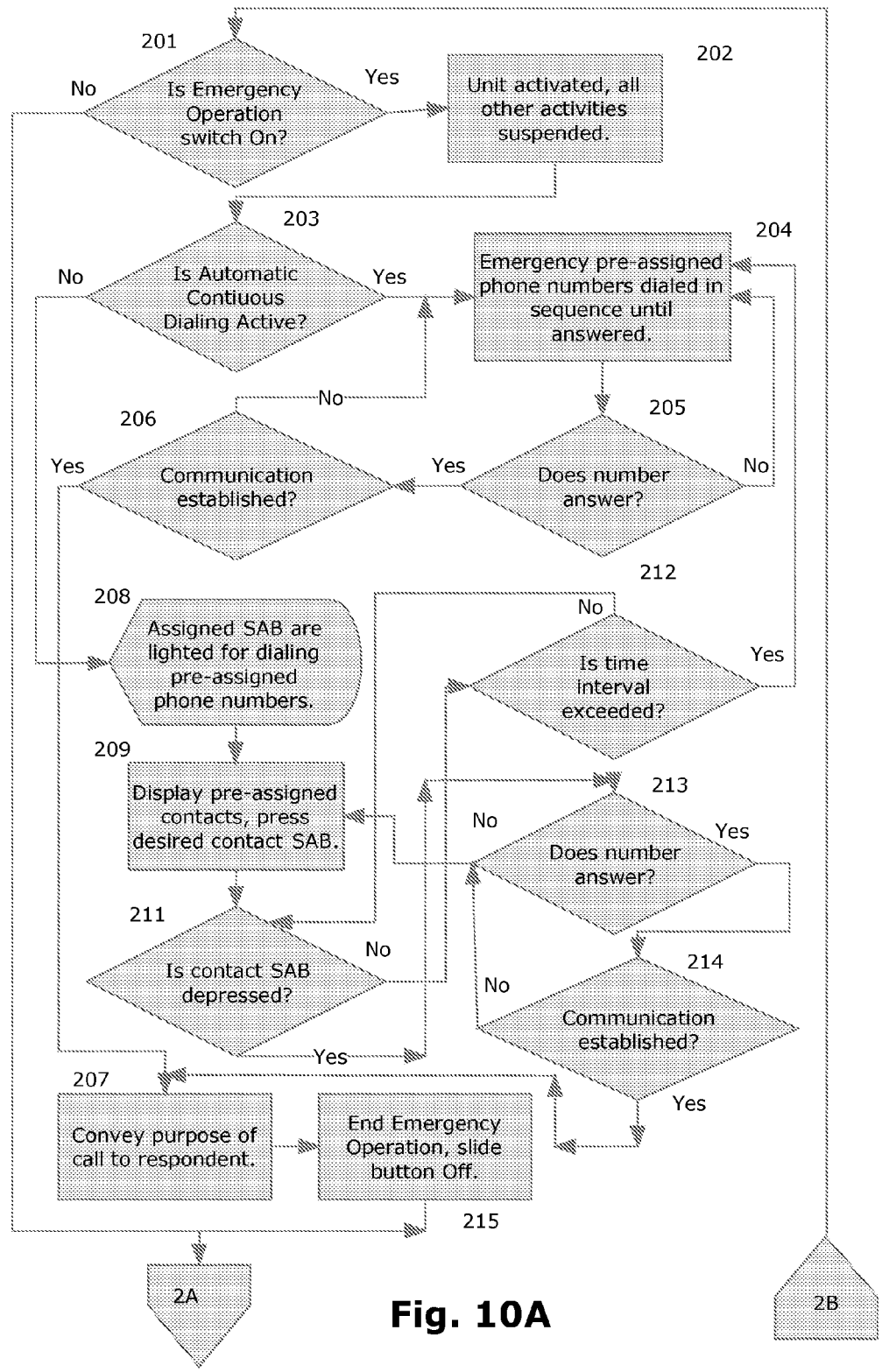
FIGS. 10A-10C depict a flow chart spanning three pages showing operations by a user of an electronic device provided with the security access buttons of this invention.

An owner or person responsible for the safe operation of vehicles, medical and scientific equipment, machinery, instruments, consoles, applicators and/or power tools such as parents or employers preferably program security access buttons 27 upon installation or purchase of one of the variants of security device 10 described above. Programming may be done manually using keyboard 12 of electronic device 100 or using the security access buttons 27 of security device 10 or by engaging an access key such as a flash or pin drive with input/output port 18 of electronic device 100 or a combination thereof. Programming may be done by the owner or person responsible, at the factory or at a point of sale. Pre-programmed access keys may be purchased at a point of sale wherein security access buttons 27 have been randomly assigned wherein the owner or person responsible for the operation of electronic device 100 in a safe manner maintains control of the pre-programmed access key. Referring now to FIG. 9A, the programming person first turns electronic device 100 "on" at step 101 thus providing power to security device 10 and electronic device 100. If security device 10 had been previously programmed, the security access button system (SAS) would be active and re-programming may begin. If security device 10 has not previously been programmed, the security access system (SAS) of security device 10 may be activated at step 103 whereupon programming may begin through step 102. If the programming person desires, use of electronic device 100 is permitted without any safe operation security at step 104 by failing to activate the SAS. In this case, the security device is inactive though electronic device 100 is active as shown at step 179 on FIG. 9G. Returning to step 105, when the SAS is active, programming cannot proceed if any security access button 27 (SAB) is pressed. If at least one SAB 27 is depressed, a message "Release SAB or Deactivate SAS" appears on display/touch screen 13 as shown in step 106. If no SAB 27 are pressed, the program then determines at step 107 if the SAS is on stand-by, and if so, determines if a preset programming timeout for non-use has been exceeded at step 109. If programming timeout has been exceeded, the programmer must begin again at step 102, else the program determines if the SAS set-up is in use at step 108. Again, if programming timeout has been exceeded, the programmer must start again at step 102. If the SAS is not on "standby", not in use and programming timeout has not been exceeded, the message "Electronic Device is "on" and SAS is ready for use" appears on display/touch screen 13 at step 111 at the top of FIG. 9B.

If the programming person has an access key, it may be inserted into input/output port 18 of electronic device 100 whereupon the program determines if an access key is present at step 112. Although the SAS may be active, all SAB 27 are currently inactive and thus if an access key is present, the program screens the message "SAB de-activated-enter password" at step 113, determines if the password is correct at step 114 and, if so, screens a second message "SAB not active-Activate SAB" at step 117. If the password is entered incorrectly at step 113, the program asks if the password has been forgotten at step 115 and if not allows re-entry of the password at step 113. If the password has been forgotten, step 116 permits retrieval of the password and the programmer may proceed to step 117. If no access key is present at step 112, the programmer proceeds directly to step 117 and is asked to activate SAB 27 by selecting an "on/off" state for selected SAB 27. Any number of SAB 27 may set to on or off as desired by the programmer and at step 119, a duration time is established for setting the "on/off" state of SAB 27. If the duration time has been exceeded at step 120, the program screens the message "Release SAB" at step 121 and returns the programmer to step 118 for setting the "on/off" state of each SAB 27. If the duration for holding SAB 27 has not been exceeded, the program proceeds to step 122 whereupon the programmer sets the emergency sliding button state to "on or off" and the program asks the programmer if other settings are desired at step 123. If so, the program proceeds to step 125 on FIG. 9C to set SAB 27 "on/off" state for keyboard operation but if not, the program proceeds directly to step 175 on FIG. 9G described hereinafter. Continuing to refer to FIG. 9C in step 126, the program asks if the keyboard option is set to an "on" state and if so, the programmer sets an "on/off" state in step 127 for each SAB 27 that was set to an "on" state in step 118 to establish the number and sequence of SAB 27 required to be held by a user of electronic device 100 while operating keyboard 13. After setting a state for each SAB 27 for keyboard operation, the program continues to step 128 for setting a state for microphone operation. Back at step 126, if the programmer desires not to set SAB 27 states for keyboard operation, the program proceeds directly to step 128 where setting of SAB 27 for microphone option is set. In the same sequence as setting the state for keyboard operation in step 125, determining if the keyboard option is "on" at step 126 and setting a state for each SAB 27 if so in step 127, these steps are repeated in steps 128, 129 and 130 for microphone operation, repeated again in steps 131, 132 and 133 for speaker operation, repeated in steps 134, 135 and 13 for viewing screen option, repeated in steps 137, 138 and 139 for photo lens operation and in steps 140, 141 and 142 for Hands Free operation. Hands Free operation cannot occur without setting a hands free holster option in step 143 as step 144 determines if the holster option has been selected. If not, the program denies Hands Free operation and terminates the programming at logoff step 178 through steps 175 and 176 or 177. If the hands free holster option is set to an "on" state, the program then determines if electronic device 100 is electronically and physically connected to the holster as set forth in the descriptions of FIGS. 7 and 8. If not, the program again denies hands free operation by proceeding directly through steps 175 and 176 or 177 to logoff at step 178. If electronic device 100 is properly connected to the hands free holster, step 147 displays that only numeric keypad operation, viewing screen, speaker, microphone and GPS operations are permitted. Pre-assigned telephone numbers and/or names are entered into electronic device 100 at step 147 thus permitting only access to those names or numbers if electronic device 100 is holstered. If the programmer only desires user access to these numbers, the programmer may select not to continue settings at step 148 and the program proceeds to step 175 for a logoff sequence. If continued settings are desired, the program displays the next step "Set GPS speed Control Setting "on/off" in step 149 and then, in step 150 determines if GPS is set to "on." If not, logoff sequence through step 175 begins but if GPS is "on," a maximum speed for operation without depressing SAB 27 is set at step 151 and selected SAB 27 are activated for operation above the set maximum in step 152. In this regard, a driver will be virtually unable to operate electronic device 100 and must either stop the vehicle or hand electronic device 100 off to a passenger who must then press the lighted SAB 27 in order to operate electronic device 100. After setting a maximum speed at step 152, the programmer is given the option in step 153 of ceasing operations and proceeding to logoff or continuing operations to set emergency state "on/off" in step 154. From step 154, the program then allows setting of emergency automatic continuous dialing in step 155 in FIG. 9F and then determines if emergency state is set to off. If so, the program directs the programmer to the logoff sequence through step 175, however, if Emergency is set to on, the display in step 157 "Depressing or sliding Emergency Button overrides all SAB settings" appears which allows emergency use only. Now, in step 158, the message "Depressing SAB 1-3 will dial pre-assigned numbers that were pre-set in step 147. The program proceeds to step 159 whereupon it is determined if an "All Emergency state is 'On,'" and if so, step 160 sets photo lens and voice activated state to "on" or "off" and the program moves on to step 160a where SAB 27 1-3 are activated or de-activated. If "All Emergency is "off," the program moves from step 159 to 160a to set the state of SAB 27 1-3.

Some SAB 27 may be used as function keys in an emergency state set in step 156, such as "Shift," "Caps Lock," "Ctrl" and/or "Alt." Thus, in step 161, the programmer sets a multifunction state to "on/off" to permit or deny use of SAB 27 as function keys. If use of SAB 27 as function keys is set to "off" in step 161, the logoff sequence begins. If the multifunction option is set to "on" in step 161, the program moves through step 162 to step 163 for setting the "on/off" state of each SAB 27 #1-4 for the various functions. A message option may then be set to "on/off" in step 164 and if set to "off" as determined in step 165, again the logoff sequence begins. If message option is set to "on," setting each SAB 27 #1-4 is set to "active" or "de-active" for each of Voice communication and Text communication in step 166. Thereafter, in step 167, transmission of messages by text, voice, e-mail, wireless/earpiece is set to an "on/off" state, and if transmission is set to "off" determined in step 168, the logoff sequence is begun. If, however, transmission of messages is set to "on" in step 168, a receiver e-mail account is set up in step 169 and a receiver phone number is set in step 170. A message is displayed in step 171 stating that "Transmission activity is stored whether SAB are on or off." Only the person responsible for safe use of electronic device 100 by the user thereof is able to access transmission messages. A wireless/earpiece option is then set to either on or off in step 172, and if wireless/earpiece option is set to "off" as determined in step 173, the logoff sequence begins at step 175. If wireless/earpiece is set to "on," the message "Wireless/Earpiece will not override Emergency Sliding Button or GPS tracking functions" appears in step 174 to alert the user that these functions are still active. From message step 174, the logoff sequence begins by asking if the Access Key is installed in step 175 and if so, the all settings are transferred to the Access Key in step 176. If the Access Key is not installed, all settings are saved to circuit board 15 of electronic device 100 in step 177 and logoff occurs in step 178.

Since a person responsible for the safe operation of an electronic device 100 is presumed to act in a responsible manner, that person, whether owner, programmer, person responsible, employer or the like, may choose not to program any SAB 27 and retain the Security Access System in an inactive state.

After completion of programming of the Security Access System for electronic device 100, a user thereof may be allowed to use electronic device 100 subject to the constraints programmed into the SAS by a person responsible for safe operation of the device. As such, it is important that the Emergency Operation of the SAS be permitted whether the remainder of the SAS is operational and even if electronic device 100 is "off." Therefore, in FIG. 10A, in step 201, a determination is first made regarding the state of the Emergency Switch. If Emergency Operation is not active, the program moves to step 216 in FIG. 10B for operation of electronic device 100, activation of GPS option and normal use permitted by other features of the SAS to be fully explained hereinafter. If Emergency is active, electronic device 100 is activated and all normal operations of electronic device 100 are suspended in step 202 until Emergency use is no longer active and the emergency button or slide 54 has been switched to the "off" position as indicated at step 215. Emergency use may include reporting of an accident whether involving the user or another, calling for help when stranded, threatened or abused, informing a parent, spouse or employer of the user's location or the like.

Figure 10B:
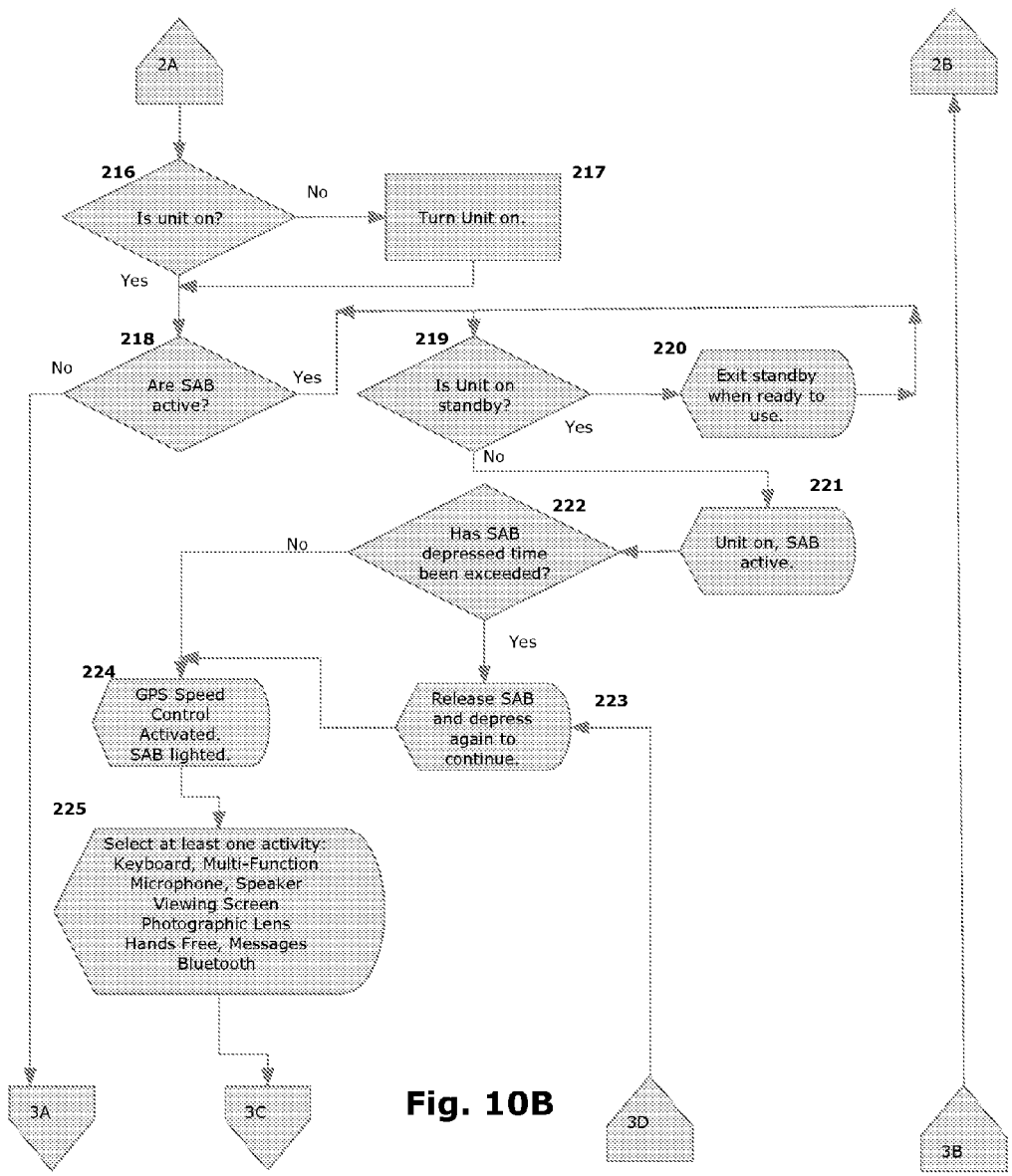

It is next determined if automatic continuous dialing is activated as asked in step 203. If active, automatic continuous dialing dials each number pre-programmed into the SAS, as shown in step 204, until a response is received. Automatic continuous dialing thus allows a person disabled by some emergency to contact help without any action except to switch emergency button 54 to an "on" position, however, as will be explained shortly hereafter, the user may selectively dial the pre-assigned numbers. In step 205, if no answer is received, as in the case of a busy signal, answering machine or failure to answer within a preset number of rings, automatic continuous dialing returns to step 204 and dials the next pre-programmed number seeking for a person to respond. If a number answers, the SAS determines if communication is established in step 206, and if not, again returns to step 204 and continues to dial the next number until communication is established. One pre-programmed number is preferably a local law enforcement agency such that if all other numbers fail to respond, the authorities are automatically contacted. Automatic continuous dialing presents to the user the opportunity to reach help even if the user is effectively disabled, and as a GPS system is preferably a part of electronic device 100, help may readily be dispatched to the location of electronic device 100. When communication is established, the user conveys the purpose of the call to the respondent as shown in step 207 and, when finished, Emergency Operation is stopped by putting emergency button or slide in the "off" position in step 215 whereupon normal operation may be started in step 216 as shown in FIG. 10B.

Returning to step 203, if automatic continuous dialing is not active, certain SAB 27 are lighted in step 208 corresponding to individual pre-assigned emergency contact numbers. These numbers are displayed on a screen in step 209 along with a message "press desired contact SAB." If an SAB 27 is pressed in step 211, a similar communication sequence as in automatic dialing begins at step 213 finding first if the number answers. If so, a determination is made whether communication is established in step 214, and if so, the user conveys the purpose of the call to the respondent as shown in step 207 and, when finished, the user then ends Emergency Operation in step 215 by moving emergency button or slide to the "off" position and resumes or begins normal operation in step 216 within the constraints of the SAS. Returning to step 213, if the dialed number does not answer, the user is again presented with a display of pre-assigned contacts in step 209 and the sequence begins anew. Likewise, in step 214, if the number answered in step 213 but communication was not established, the user is returned to step 209 for more contacts. A safety feature for the user is provided in step 211 in case the user becomes incapacitated, unconscious or loses contact with electronic device 100 and no SAB 27 is pressed, a time interval for response has been set and if exceeded, automatic continuous dialing begins in step 204 as described above. If the time interval has not yet been exceeded, the program again determines in step 211 if a desired SAB 27 has been pressed looping back through step 212 until the time interval has been exceeded.

Figure 10C:
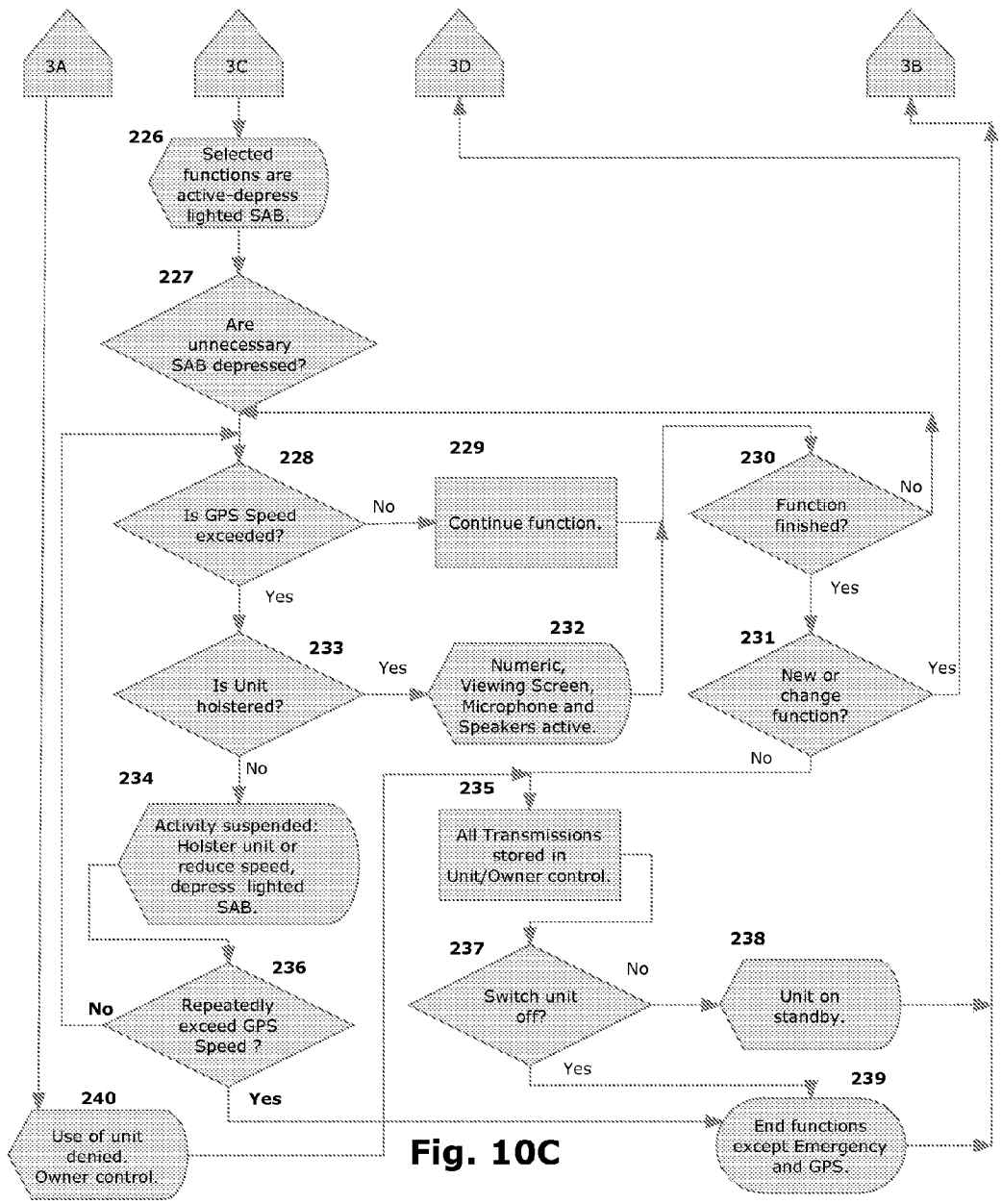

As previously described, if emergency operation switch 54 is not in the "on" position, electronic device 100 may be "on" from a standby state after a previous operation as shown in step 238 in FIG. 10C or may be "on" after completion of an emergency operation at step 215, however, electronic device 100 may also be in "off" position from extended non-use or previously placed in "off." Therefore, in step 216, the operational state of electronic device 100 is determined, and if in the "off" position, the user is instructed to turn electronic device 100 "on" in step 217. Next, in step 218, the state of SAB 27 is determined, and if in active, use of the unit is denied for the user and the user is so informed in step 240, however, the person responsible for safe operation may either program the SAB 27, access, view or manage transmissions stored in memory in step 235, switch the unit "off" or place the unit in "standby" in steps 237 or 238 respectively. Returning to step 218, if SAB 27 are active, the standby status is determined in step 219 and if in "standby," the user is instructed in step 220 to "Exit standby when ready to use" whereupon the program loops back to step 219 for determination of standby status. Of course, the user may move from "standby" directly to Emergency Operation at step 201 as electronic device 100 may be operated in Emergency mode from any state. If "standby" is not detected in step 219, step 221 displays the message "Unit on, SAB active" to alert the user to use SAB 27 for desired functions. If, however, the user has already pressed and held any SAB 27, for instance when Emergency Operation has been used but has been switched off upon completion of the emergency state, a determination is made at step 222 if a preset depressed time has been exceeded. If so, the user is instructed at step 223 to release all SAB 27 and the program proceeds to activation of GPS speed in step 224. If no SAB 27 has been held, the SAB 27 depressed time determination is negative and the program proceeds directly to step 224 for GPS speed activation whereupon all SAB 27 are lighted to alert the user that GPS operation is active.

At step 225, the user may select from normal operations of electronic device 100 whereupon SAB 27 that were designated by the person responsible for safe operation are lighted for the selected activity. Multiple activities may be selected by pressing SAB 27 in the pre-programmed sequence. For instance, if the person responsible for safe operation had designated SAB 27 at two opposed corners of electronic device 100 for keyboard activity, one of the SAB 27 at opposite opposed corners of electronic device 100 may have been programmed to also allow viewing screen activity thus requiring the user to hold three SAB 27 for these two simultaneous operations. Of course, if keyboard activity is desired, it is also possible within the scope of this invention to automatically allow viewing screen activity. SAB 27 may have also been programmed in sequence such that one activity is made possible by pressing two SAB 27 in one sequence while another operation is made possible by pressing these same two SAB 27 in the opposite order. Thus, in step 226, the user is instructed to depress the lighted SAB 27 for the selected activity whereupon in step 227 it is determined if unnecessary SAB 27 were depressed. If so, the user is instructed to release SAB 27 and properly depress SAB 27 to continue the activity. If no unnecessary SAB 27 are depressed, the GPS speed is checked in step 228, and if exceeded, it is then determined in step 233 if electronic device 100 is holstered as described in reference to FIGS. 7 and 8. If electronic device 100 is not holstered, the selected activities are interrupted and, in step 234, the user is instructed to reduce speed and depress the lighted SAB 27 again. Since activities have been interrupted, the prudent user will reduce speed to restart selected activities or holster electronic device 100 in clamping device 80, cross brace device 90 or holster device 92 or hand electronic device 100 to another not engaged in multi-tasking in order to continue a reduced number of activities as displayed for the user in step 232 as only numeric keys, viewing screen, microphone and speakers are active when electronic device 100 is holstered. Perchance the user repeatedly exceeds GPS speed as determined at step 236, all functions are stopped in step 239 except Emergency and GPS.

GPS speed may be set by the person responsible for safe operation of electronic device at any speed, however, it is preferable that GPS speed be set so low that little movement of electronic device 100 is allowed without depressing SAB 27 for operational activities. If it is determined in step 228 that GPS speed has not been exceeded, the selected activities may continue through step 229 until it is determined in step 230 whether activities are finished. If so, the user is asked in step 231 if a new activity is desired, and if so, the user is directed to release SAB 27 in step 223 for previous activities and returned to step 224 where the user is again reminded that GPS operation is active. Thereafter, the user may select new activities in step 225 and proceed as set forth in the preceding paragraph. If activities are not finished, the user is returned to step 228 to check again for GPS speed and if not exceeded to continue the selected activity. If, in steps 230 and 231 the user is finished with current activities and does not desire an new activity, all transmissions from electronic device 100 are stored in electronic device 100 as set forth in step 235 and may only be accessed by the person responsible for safe operation of electronic device 100. In step 237, the user may then switch the unit "off" thus ending all functions except Emergency Operation and GPS speed in step 239 or the user may switch electronic device 100 to standby in step 238 and resume operations thereof at a later time by returning to step 201.

Having set forth the preferred and alternate embodiments of this invention and fully described the functions thereof, the objects of this invention have been accomplished. Thus, while employing housing 10 of this invention with portable electronic devices 100, a driver of a vehicle must make a decision concerning use of electronic device 100 while operating the vehicle. The driver must decide whether to ignore electronic device 100, stop the vehicle in a safe place and actuate electronic device 100 in the manner described above using both hands and thereafter operate electronic device 100 with both hands or to allow a passenger to operate electronic device 100 while the driver concentrates on driving the vehicle. The owner or person responsible for safe operation of the vehicle can rest assured that the vehicle is being operated without interference from electronic device 100.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

We claim:

1. A security access device for an existing portable electronic device to prevent use of said electronic device while an operator thereof is attempting to multi-task while operating another device selected from the group consisting of a vehicle, medical or scientific equipment, instruments, consoles, applicators, power tools or hand tools wherein said portable electronic device comprises a keypad, at least one viewing screen, a battery, an electronic circuit board, at least one function button, an audio output jack, a data input/output port, a charging port and a photographic lens and said security access device comprises a plurality of security access buttons operatively associated with said electronic device, said security access buttons provided at strategically positioned locations on said security access device, said security access buttons comprising tactile surfaces requiring constant physical contact in order to operate said electronic device wherein said security access device comprises a clamping mechanism, said clamping mechanism comprises at least two arms, at least two bases and at least two hooks, said arms adjustably mounted to said bases, said hooks adjustably mounted to said arms, said hooks engaged with edges of said electronic device.

2. The security access device for an existing portable electronic device as in claim 1 wherein said security access buttons are disposed on extensions of said arms of said clamping mechanism.

3. The security access device for an existing portable electronic device as in claim 2 wherein said security access buttons are disposed on front and back surfaces of said extensions.

4. The security access device for an existing portable electronic device as in claim 3 wherein an operational association of said security access device to said electronic device is through a data connector disposed on an inside surface of one said hook, said data connector inserted into said data input/output port of said electronic device.

5. The security access device for an existing portable electronic device as in claim 4 wherein said existing electronic device is provided with security access buttons on external surfaces thereof.

6. A security access device for an existing portable electronic device to prevent use of said electronic device while an operator thereof is attempting to multi-task while operating another device selected from the group consisting of a vehicle, medical or scientific equipment, instruments, consoles, applicators, power tools or hand tools wherein said portable electronic device comprises a keypad, at least one viewing screen, a battery, an electronic circuit board, at least one function button, an audio output jack, a data input/output port, a charging port and a photographic lens and said security access device comprises a plurality of security access buttons operatively associated with said electronic device, said security access buttons provided at strategically positioned locations on said security access device, said security access buttons comprising tactile surfaces requiting constant physical contact in order to operate said electronic device wherein said security access device comprises a cross brace mechanism, said cross brace mechanism comprises at least two arms and at least two hooks, said arms joined in an angular relationship by a pivot, said arms angularly adjustable relative to said pivot, said arms adjustable longitudinally relative to said pivot, said hooks mounted at terminal ends of said arms, said hooks engaged with orthogonal corners of said electronic device.

7. The security access device for an existing portable electronic device as in claim 6 wherein said security access buttons are disposed into external surfaces of said hooks of said cross brace mechanism.

8. The security access device for an existing portable electronic device as in claim 7 wherein an operational association of said security access device to said electronic device is through a data connector disposed on a terminal end of a cable link, said data connector inserted into said data input/output port of said electronic device.

9. A security access device for an existing portable electronic device to prevent use of said electronic device while an operator thereof is attempting to multi-task while operating another device selected from the group consisting of a vehicle, medical or scientific equipment, instruments, consoles, applicators, power tools or hand tools wherein said portable electronic device comprises a keypad, at least one viewing screen, a battery, an electronic circuit board, at least one function button, an audio output jack, a data input/output port, a charging port and a photographic lens and said security access device comprises a plurality of security access buttons operatively associated with said electronic device, said security access buttons provided at strategically positioned locations on said security access device, said security access buttons comprising tactile surfaces requiring constant physical contact in order to operate said electronic device wherein said security access device comprises a wireframe enclosure, said wireframe enclosure comprising a plurality of corner portions, securing straps, security access buttons, a cable link, a data connector and an emergency button, said corner portions adapted to fit corners of said portable electronic device, said security access buttons disposed into recesses in external surfaces of said corner portions, said corner portions joined together by said securing straps, said securing straps provided with pawl surfaces thereupon wherein said securing straps pass through ratchet apertures of said corner portions, said security access device affixed to said existing portable electronic device by engaging said corner portions of said security access device with said corners of said existing portable electronic device.

10. The security access device for an existing portable electronic device as in claim 9 wherein said security access device is operatively connected to said electronic device by engaging said data connector disposed at a terminal end of said cable link into said data input/output port of said electronic device.

11. The security access device for an existing portable electronic device as in claim 9 wherein said emergency button is slidably associated along one of said securing straps.

12. A security access device for an existing portable electronic device to prevent use of said electronic device while an operator thereof is attempting to multi-task while operating another device selected from the group consisting of a vehicle, medical or scientific equipment, instruments, consoles, applicators, power tools or hand tools wherein said portable electronic device comprises a keypad, at least one viewing screen, a battery, an electronic circuit board, at least one function button, an audio output jack, a data input/output port, a charging port and a photographic lens and said security access device comprises a plurality of security access buttons operatively associated with said electronic device, said security access buttons provided at strategically positioned locations on said security access device, said security access buttons comprising tactile surfaces requiring constant physical contact in order to operate said electronic device wherein said security access device comprises a form fitting enclosure, said form fitting enclosure comprises a framework, a flexible membrane, security access buttons, a cable link, a data connector and an emergency button, said flexible membrane surrounding said framework, said security access buttons provided on corner portions of said framework and disposed through said flexible membrane, said emergency button provided on one external edge of said framework, said emergency button disposed through said flexible membrane.

13. The security access device for an existing portable electronic device as in claim 12 wherein said security access device is operatively connected to said electronic device by engaging said data connector disposed at a terminal end of said cable link into said data input/output port of said electronic device.

\* \* \* \* \*